US012757213B2

(12) United States Patent
Wang et al.

(10) Patent No.: US 12,757,213 B2
(45) Date of Patent: *Oct. 6, 2026

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Tomohumi Takata, Ishikawa (JP); Shotaro Maki, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 18/773,370

(22) Filed: Jul. 15, 2024

(65) Prior Publication Data

US 2024/0373437 A1 Nov. 7, 2024

Related U.S. Application Data

(63) Continuation of application No. 18/464,119, filed on Sep. 8, 2023, now Pat. No. 12,075,445, which is a (Continued)

(51) Int. Cl.

*H04W 72/23* (2023.01)
*H04L 1/1812* (2023.01)
*H04L 5/00* (2006.01)

(52) U.S. Cl.

CPC ........... *H04W 72/23* (2023.01); *H04L 1/1812* (2013.01); *H04L 5/0007* (2013.01); *H04L 5/0048* (2013.01)

(58) Field of Classification Search

CPC ... H04L 1/1812; H04L 5/0048; H04L 5/0007; H04L 5/0044; H04L 5/0051; H04W 72/042

See application file for complete search history.

(56) References Cited

U.S. PATENT DOCUMENTS 9,300,457 B2 * 3/2016 Suzuki .................. H04L 5/0053
10,243,639 B2 * 3/2019 Kim ...................... H04L 5/0053

(Continued)

FOREIGN PATENT DOCUMENTS

JP 2016523038 A 8/2016
KR 20140126230 A 10/2014
WO WO 2017019132 A1 2/2017

OTHER PUBLICATIONS

Alcatel-Lucent Shanghai Bell, Alcatel-Lucent, "Discussion of DMRS overhead reduction for small cells," R1-130944, Agenda Item: 7.2.5.2.1, 3GPP TSG RAN WG1 Meeting #72bis, Chicago, U.S.A., Apr. 15-19, 2013. (4 pages).

(Continued)

*Primary Examiner* — Syed Ali

(74) *Attorney, Agent, or Firm* — Seed Intellectual Property Law Group LLP

(57) ABSTRACT

Provided are a user equipment, base station and wireless communication methods related to uplink control information mapping in physical uplink resources in NR (New Radio access technology). A user equipment comprises: circuitry operative to map, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain; and (Continued)

a transmitter operative to transmit the UCI and the reference signals in PUSCH on the PRBs to a base station.

19 Claims, 20 Drawing Sheets

Related U.S. Application Data continuation of application No. 18/148,407, filed on Dec. 29, 2022, now Pat. No. 11,792,823, which is a continuation of application No. 17/306,501, filed on May 3, 2021, now Pat. No. 11,570,768, which is a continuation of application No. 16/631,493, filed as application No. PCT/CN2017/096724 on Aug. 10, 2017, now Pat. No. 11,026,222.

(56) References Cited

U.S. PATENT DOCUMENTS 10,834,745 B2 11/2020 Kim et al.
11,374,712 B2 6/2022 Yum et al.
11,388,704 B2 7/2022 Shimezawa et al.
11,665,750 B2 5/2023 Kim et al.
2011/0310759 A1 12/2011 Gerstenberger et al.
2012/0106407 A1 5/2012 Papasakellariou et al.
2012/0106408 A1 5/2012 Papasakellariou et al.
2012/0269103 A1 10/2012 Papasakellariou et al.
2012/0275400 A1 11/2012 Chen et al.
2015/0055582 A1 2/2015 Park et al.
2015/0085802 A1* 3/2015 Papasakellariou ........ H04L 27/2602 370/329
2015/0208366 A1 7/2015 Papasakellariou et al.
2015/0305059 A1* 10/2015 Li ........ H04L 1/1812 370/329
2016/0028527 A1* 1/2016 Nam ........ H04L 5/0051 370/329
2016/0056942 A1 2/2016 Wang et al.
2016/0112994 A1 4/2016 Wang et al.
2016/0295561 A1 10/2016 Papasakellariou
2016/0374090 A1* 12/2016 Kim ........ H04L 5/0055
2017/0033908 A1 2/2017 Hwang et al.
2017/0155494 A1 6/2017 Tavildar et al.
2017/0366311 A1 12/2017 Iyer et al.
2018/0041301 A1 2/2018 Huss et al.
2018/0132269 A1* 5/2018 Wang ........ H04L 5/0051
2018/0167933 A1 6/2018 Yin et al.
2018/0192417 A1 7/2018 Yin et al.
2018/0220414 A1 8/2018 Yin et al.
2018/0227035 A1 8/2018 Cheng et al.
2018/0227908 A1* 8/2018 Wang ........ H04L 5/0053
2018/0270700 A1 9/2018 Babaei et al.
2018/0323909 A1 11/2018 Ying et al.
2019/0068423 A1* 2/2019 Hwang ........ H04L 27/2613
2019/0165896 A1* 5/2019 Huang ........ H04L 1/1664
2019/0199420 A1 6/2019 Faxér et al.
2019/0268852 A1 8/2019 Ryu et al.
2019/0335449 A1* 10/2019 Xiong ........ H04L 5/0053
2020/0008228 A1 1/2020 Lee et al.
2020/0014514 A1 1/2020 Gao et al.
2020/0022176 A1 1/2020 Osawa et al.
2020/0092876 A1 3/2020 Cho et al.
2020/0112410 A1 4/2020 Takeda et al.
2020/0145079 A1 5/2020 Marinier et al.
2020/0213057 A1 7/2020 Bala et al.
2020/0220755 A1 7/2020 Maki et al.
2020/0267718 A1 8/2020 Park et al.
2020/0288442 A1 9/2020 Murayama et al.
2020/0304192 A1 9/2020 Yum et al.
2020/0322199 A1 10/2020 Matsumura et al.
2021/0092758 A1 3/2021 Saito et al.
2021/0119756 A1 4/2021 Takeda et al.
2021/0120435 A1 4/2021 Tomeba et al.
2021/0127409 A1 4/2021 Park et al.
2021/0136748 A1 5/2021 Choi et al.
2021/0409173 A1 12/2021 Chatterjee et al.

OTHER PUBLICATIONS

CATT, "Discussion on DMRS design for UL," R1-1707488, Agenda Item: 7.1.2.4.2, 3GPP TSG RAN WG1 Meeting #88bis, Hangzhou, China, May 15-19, 2017, 6 pages.
English Translation of Chinese Office Action, dated Jul. 14, 2023, for Chinese Patent Application No. 202210849186.2. (13 pages).
Extended European Search Report dated Jun. 22, 2020 for the related European Patent Application No. 17921311.1, 8 pages.
Huawei, "CR to 38.212 capturing the Jan. 18 ad-hoc and RAN1#92 meeting agreements," R1-1803553 3GPP TSG RAN WG1 Meeting #92, Athens, Feb. 26-Mar. 1, 2018. (99 pages).
Huawei, HiSilicon, "Discussion on collision of sTTI/TTI in UL," R1-1704262, Agenda Item: 7.2.1.2.1.4, 3GPP TSG RAN WG1 Meeting #88bis, Spokane, USA, Apr. 3-7, 2017. (9 pages).
Huawei, HiSilicon, "sUCI on sPUSCH," R1-1611162, Agenda Item: 6.2.10.2.3, 3GPP TSG RAN WG1 Meeting #87, Reno, USA, Nov. 14-18, 2016. (3 pages).
Huawei, HiSilicon, "UCI for NB-IoT," R1-160324, Agenda Item: 7.2.1.2.1, 3GPP TSG-RAN WG1 Meeting #84, St Julian's, Malta, Feb. 15-19, 2016. (6 pages).
Huawei, HiSilicon, "UCI on sPUSCH," R1-1608639, Agenda Item: 7.2.10.2.1, 3GPP TSG RAN WG1 Meeting #86bis, Lisbon, Portugal, Oct. 10-14, 2016. (8 pages).
Intel Corporation, "UCI multiplexing onto PUSCH," R1-1710558, Agenda No. 5.1.3.2.5.1, 3GPP TSG RAN WG1 NR Ad-Hoc#2, Qingdao, China, Jun. 27-30, 2017, 4 pages.
International Search Report, mailed Apr. 28, 2018, for International Patent Application No. PCT/CN2017/096724. (3 pages).
LG Electronics, "Enhancement to UCI on PUSCH for Rel-13 CA," R1-154250, Agenda Item: 7.2.2.1.4, 3GPP TSG RAN WG1 Meeting #82, Beijing, China, Aug. 24-28, 2015. (4 pages).
LG Electronics, "Support of UCI piggyback on PUSCH for NR," R1-1710320, Agenda No. 5.1.3.2.5.1, 3GPP TSG RAN WG1 NR Ad-Hoc#2, Qingdao, China, Jun. 27-30, 2017, 5 pages.
Nokia, Alcatel-Lucent Shanghai Bell, "UCI transmission on LAA SCells," R1-164920, Agenda item: 6.2.1.3 Uplink control information on an LAA SCell, 3GPP TSG-RAN WG2 Meeting #85, Nanjing, China, May 23-27, 2016. (4 pages).
NTT Docomo, Inc., "UCI on PUSCH," R1-1713945, Agenda Item: 6.1.3.2.5.1, 3GPP TSG RAN WG1 Meeting #90, Prague, Czechia, Aug. 21-25, 2017. (7 pages).
Samsung, "Evaluation results on DL DMRS for NR," R1-1707973, Agenda item: 7.1.2.4.2, 3GPP TSG RAN WG1 meeting #89, Hangzhou, P.R. China, May 15-19, 2017. (5 pages).
Wilus Inc., "Discussion on UCI piggyback on PUSCH," R1-1711359, Agenda Item: 5.1.3.2.5.1, 3GPP TSG RAN WG1 NR Ad-Hoc#2, Qingdao, China. Jun. 27-30, 2017. (5 pages).
ZTE, "DL DMRS simulation results," R1-1707135, Agenda item: 7.1.2.4.2, 3GPP TSG RAN WG1 Meeting #89, Hangzhou, China, May 14-19, 2017. (10 pages).
Mediatek et al., "WF on DMRS design," R1-1711784, Agenda item: 5.1.2.4.3, 3GPP TSG RAN WG1 Meeting NR Ad-Hoc#2, Qingdao, China, Jun. 27-30, 2017. (4 pages).

* cited by examiner

UE 1500

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (eNodeB) and wireless communication methods related to uplink control information mapping in physical uplink resources in NR (New Radio access technology).

2. Description of the Related Art

As well known, Uplink Control Information (UCI) may be Channel State Information (CSI), Hybrid Automatic Repeat request-Acknowledgement (HARQ-ACK) or Rank Indicator (RI). In uplink of Long Term Evolution (LTE), UCI can be transmitted (mapped) in Physical Uplink Control Channel (PUCCH) or Physical Uplink Shared Channel (PUSCH). For example, FIG. 1 schematically shows an exemplary scenario of UCI mapping in PUSCH in LTE.

Specifically, in FIG. 1 there is shown a structure of a physical resource block (PRB) 10. The abscissa axis (T) of the PRB 10 represents time (Orthogonal Frequency Division Multiplexing (OFDM) symbols), and its vertical axis (F) represents width of frequency band (subcarriers). For the PRB 10, the abscissa axis is divided into 14 sections, each of which forms an OFDM symbol in the vertical axis direction. The vertical axis is divided into 12 sections, each of which forms a subcarrier in the abscissa axis direction. Each small block within the PRB 10 represents a resource element (RE), and all 12X14 REs of the PRB 10 form a 1 ms subframe, which includes slot 1 and slot 2 along the abscissa axis direction.

It is noted that the structure of the PRB 10 shown in FIG. 1 is only an example for convenience of explanation of the present disclosure, and the present disclosure is not limited thereto. Alternatively, a PRB may also include 12X7 REs in another example, or may have any other suitable structure depending on specific requirement.

As shown in FIG. 1, there are two columns of REs are used to transmit Demodulation Reference Signals (DMRSs). The fourth OFDM symbol in each of the two slots in the same subframe is used to transmit DMRSs, as shown by REs filled with left oblique lines. Basically, in LTE, different types of UCIs are allocated at edges of allocated PUSCH. As shown in FIG. 1, CSI is transmitted at top of the PRB 10, as shown by REs filled with right oblique lines. Whereas, HARQ-ACK and RI are transmitted at bottom of the PRB 10, as shown by REs filled with vertical lines and horizontal lines respectively. The remaining part of the PRB 10 is used to transmit data part, as shown by blank REs.

In addition, based on priority, HARQ-ACKs are transmitted on REs adjacent to REs where DMRSs are mapped while RIs are next to HARQ-ACKs and a little farther away from DMRSs. In addition, PUSCH is rate-matched around CSI and RI REs but HARQ-ACK REs are punctured. So, the handling is different between CSI/RI and HARQ-ACK.

In LTE, since DMRS pattern is fixed, the mapping of UCI is fixed. In NR/5G, UCI mapping in PUSCH is still under discussion.

SUMMARY

One non-limiting and exemplary embodiment facilitates mapping of UCI in PUSCH in NR to avoid RS collision and improve channel performance.

In a first general aspect of the present disclosure, there is provided a user equipment, comprising: circuitry operative to map, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain; and a transmitter operative to transmit the UCI and the reference signals in PUSCH on the PRBs to a base station.

In a second general aspect of the present disclosure, there is provided a base station, comprising: a receiver operative to receive Uplink Control Information (UCI) and reference signals in Physical Uplink Shared Channel (PUSCH) on physical resource blocks (PRBs) for PUSCH from a user equipment; and circuitry operative to demap the UCI and the references signals from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain.

In a third general aspect of the present disclosure, there is provided a wireless communication method for a user equipment, comprising: mapping, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain; and transmitting the UCI and the reference signals in PUSCH on the PRBs to a base station.

In a fourth general aspect of the present disclosure, there is provided a wireless communication method for a base station, comprising: receiving Uplink Control Information (UCI) and reference signals in Physical Uplink Shared Channel (PUSCH) on physical resource blocks (PRBs) for PUSCH from a user equipment; and demapping the UCI and the references signals from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
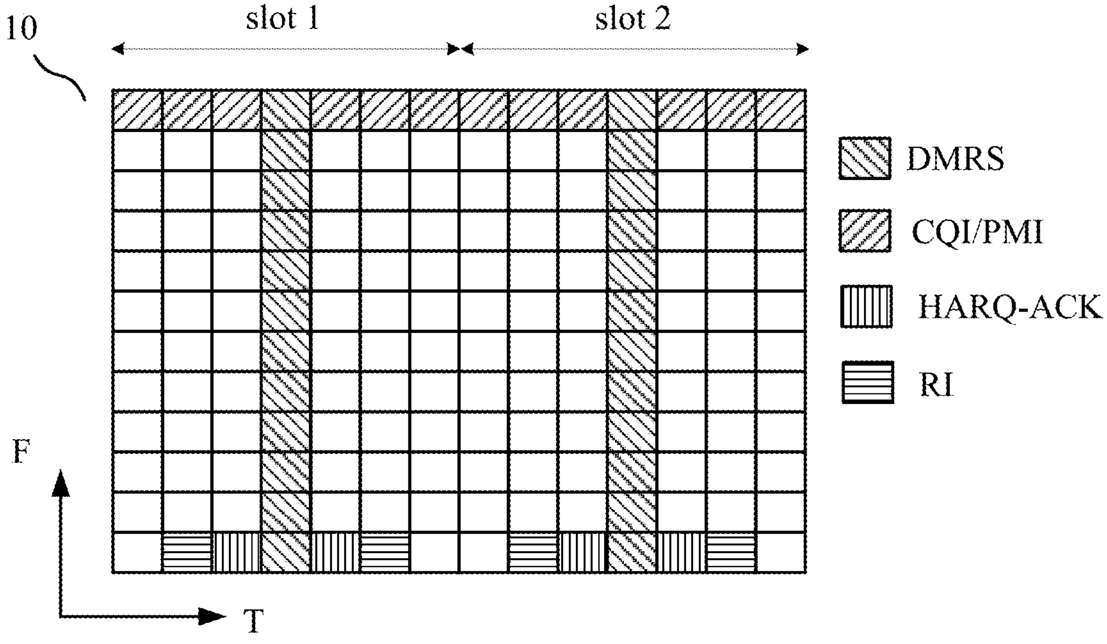
FIG. 1 schematically shows an exemplary scenario of UCI mapping in PUSCH in LTE.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

As described above with reference to FIG. 1, in LTE, DMRS pattern is fixed. However, in NR, based on the agreements, DMRS pattern could vary. FIG. 2 schematically shows two possible configurations for DMRSs in NR.

Figure 2A:
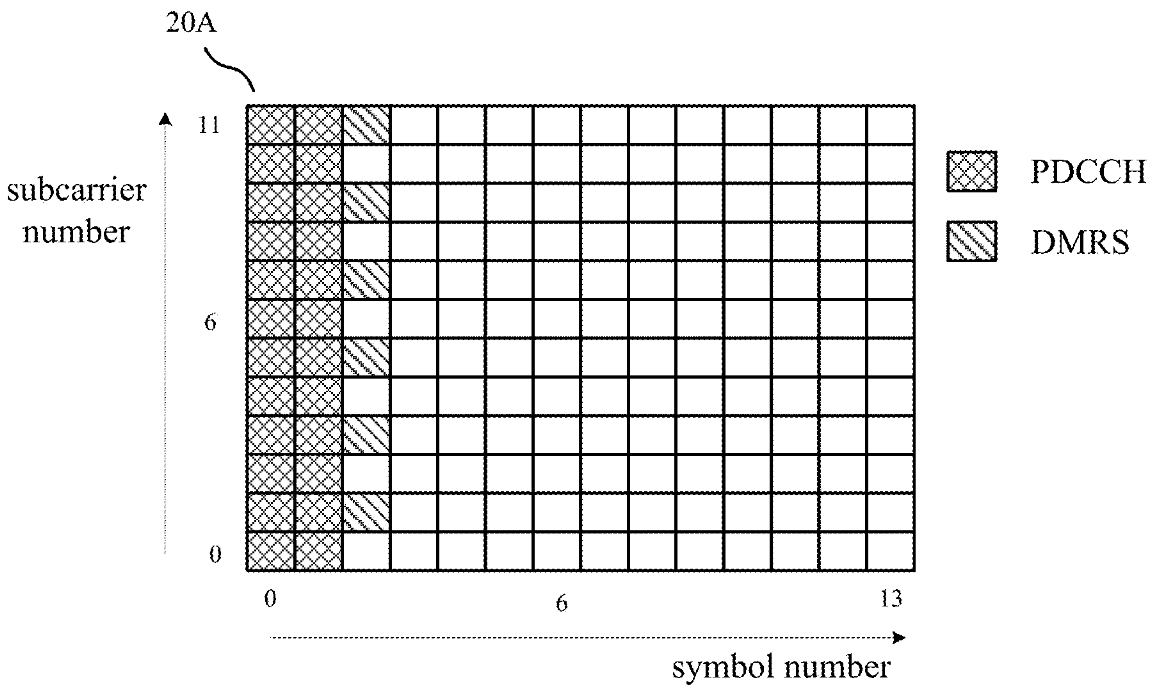
FIGS. 2A-2B schematically show two possible configurations for DMRSs in NR.

Specifically, FIG. 2(A) shows a PRB 20A which corresponds to a case of Comb like configuration for example. As shown in FIG. 2(A), Physical Downlink Control Channel (PDCCH) is mapped to the first two symbols in the PRB 20A, i.e. symbols 0, 1, as shown by REs filled with cross lines. DMRSs are mapped to symbol 2 in time domain and subcarriers 1, 3, 5, 7, 9 and 11 in frequency domain, as shown by REs filled with left oblique lines. Here, symbol number on abscissa axis (T) and subcarrier number on vertical axis (F) are indicated in order to easily identify positions of REs in PRB.

Figure 2B:
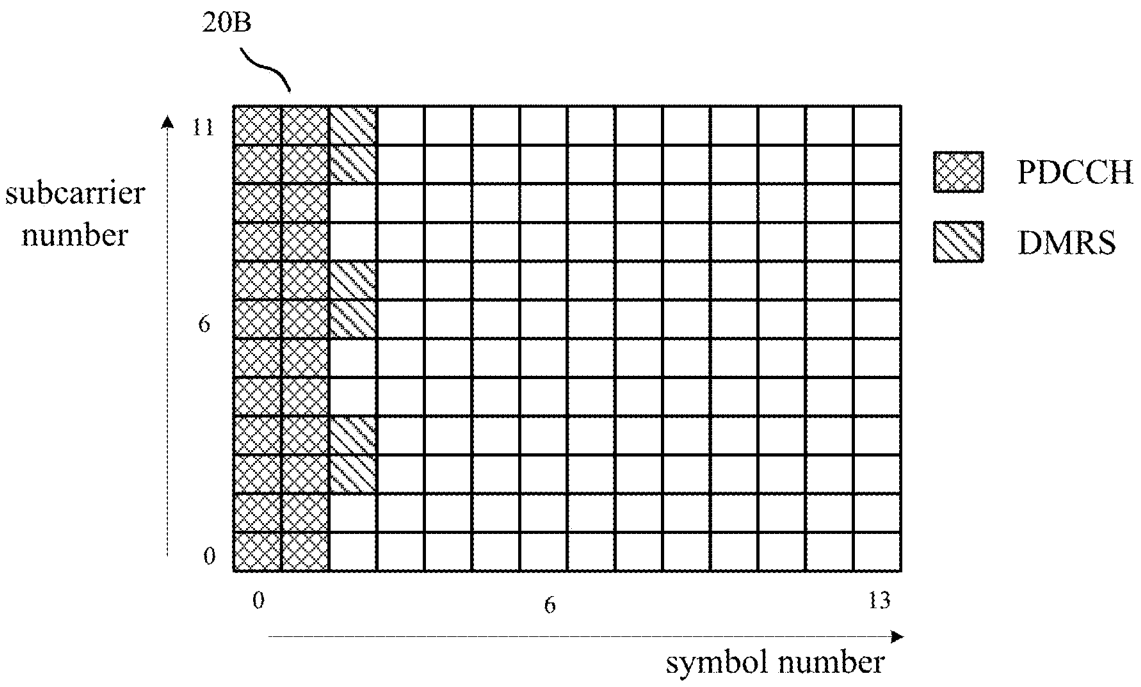

In contrast, FIG. 2(B) shows a PRB 20B which corresponds to a case of length-2 FD (Frequency Domain) OCC (Orthogonal Cover Code) based configuration for example. As shown in FIG. 2(B), PDCCH is mapped to the first two symbols in the PRB 20B, i.e. symbols 0, 1, as shown by REs filled with cross lines. DMRSs are mapped to symbol 2 in time domain and consecutive subcarriers 2&3, 6&7, and 10&11 in frequency domain, as shown by REs filled with left oblique lines.

It can be seen that since configurations of FIG. 2(A) and FIG. 2(B) are different from each other, DMRS patterns thereof are different from each other accordingly. Thus, DMRS pattern may vary based on different configurations in NR, which will impact the mapping of UCI in NR. It is noted that, gap between PDCCH and PUSCH is ignored here for convenience of explanation.

Currently in LTE, the waveform of uplink is Discrete Fourier Transform-spread-Orthogonal Frequency Division Multiplexing (DFT-S-OFDM) while Cyclic Prefix-Orthogonal Frequency Division Multiplexing (CP-OFDM) is used as waveform of downlink. However, in NR, these two waveforms are both supported for uplink. In addition to different configurations as shown in FIG. 2, different waveforms will also impact the mapping of UCI in NR. The principles of DFT-S-OFDM and CP-OFDM are well known in the related art and thus will not be explained in detail herein. The main difference of them is whether additional DFT operation is present or not.

In addition, In NR, Phase Tracking-Reference Signal (PT-RS) is adopted and is a new RS compared to LTE. PT-RS is supported in both uplink and downlink in NR and used for compensating common phase error (CPE). PT-RS pattern may also vary based on configuration and/or implicit indication by some fields in Downlink Control Information (DCI). For example, assuming UE will transmit two layers, with layer 1 being transmitted via antenna port 1 and layer 2 being transmitted via antenna port 2. PT-RSs are transmitted on certain REs in layer 1 only, and REs in layer 2 corresponding to the certain REs are blanked. Further, PT-RSs are allocated consecutively in time domain (symbol level), that is to say, RT-RSs are mapped to some consecutive symbols in time domain on a same subcarrier. The collision with PT-RS should also be taken into account for the mapping of UCI in NR.

Thus, the basic problem is how to design UCI mapping in PUSCH for all different cases (for example, different waveforms, different DMRS and/or PT-RS patterns, etc.) in NR especially considering RS collision and better channel performance.

Figure 3:
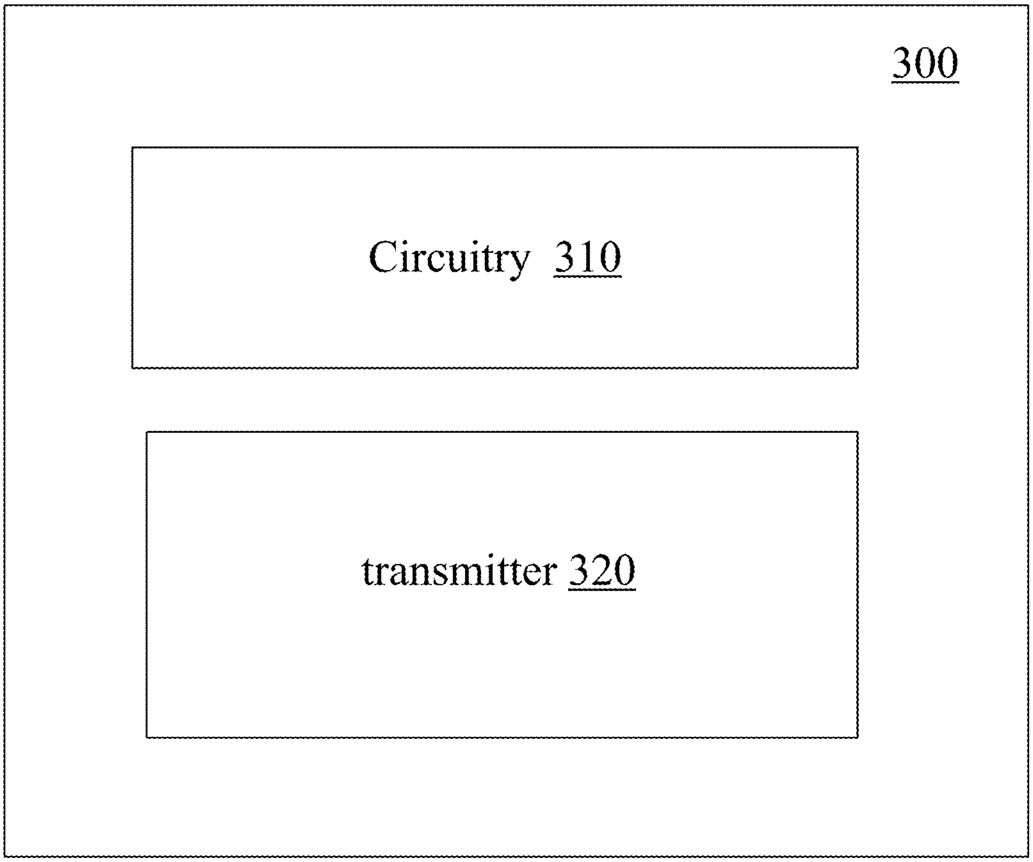
FIG. 3 illustrates a block diagram of a part of a user equipment according to an embodiment of the present disclosure.

In an embodiment of the present disclosure, there is provided a user equipment as shown in FIG. 3. FIG. 3 illustrates a block diagram of a part of a user equipment 300 according to an embodiment of the present disclosure. As shown in FIG. 3, the UE 300 may include circuitry 310 and a transmitter 320. The circuitry 310 is operative to map, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain. The transmitter 320 is operative to transmit the UCI and the reference signals in PUSCH on the PRBs to a base station.

Specifically, the circuitry 310 implements mapping of UCI to physical resources, i.e., REs in PRBs for PUSCH. For example, PRBs are like the PRB as shown in FIG. 1 or FIG. 2. The circuitry 310 maps UCI to REs according to these REs' distances with REs for transmitting RSs (for example, DMRSs and/or PT-RSs) in time domain, according to these REs' distances with REs for transmitting RSs in frequency domain, according to these REs' distances with REs for transmitting RSs in spatial domain, or according to these REs' distances with REs for transmitting RSs in any combination of them. Here, spatial domain for example relates to a case of multiple layer transmission, which will be explained in detail by way of example hereinafter.

After the resource mapping by circuitry 310, the transmitter 320 may transmit UCI and RSs in PUSCH on the PRBs to a base station.

By mapping UCI to REs according to these REs' distances with REs where RSs are mapped in one or more of time domain, frequency domain and spatial domain, RS collision may be avoided and system performance may be improved in NR.

According to an embodiment of the present disclosure, the circuitry 310 is further operative to map UCI to one or more available resource elements whose distances with resource elements where reference signals are mapped are shortest in one or more of time domain, frequency domain and spatial domain.

Specifically, the circuitry 310 may map UCI to REs whose distances with REs for transmitting RSs (for example, DMRSs and/or PT-RSs) are shortest in time domain, in frequency domain, in spatial domain, or in any combination thereof. Specific examples thereof will be given hereinafter.

According to an embodiment of the present disclosure, the reference signals comprise DMRSs, and UCI is mapped by the circuitry 310 to same subcarriers as DMRSs.

Figure 4A:
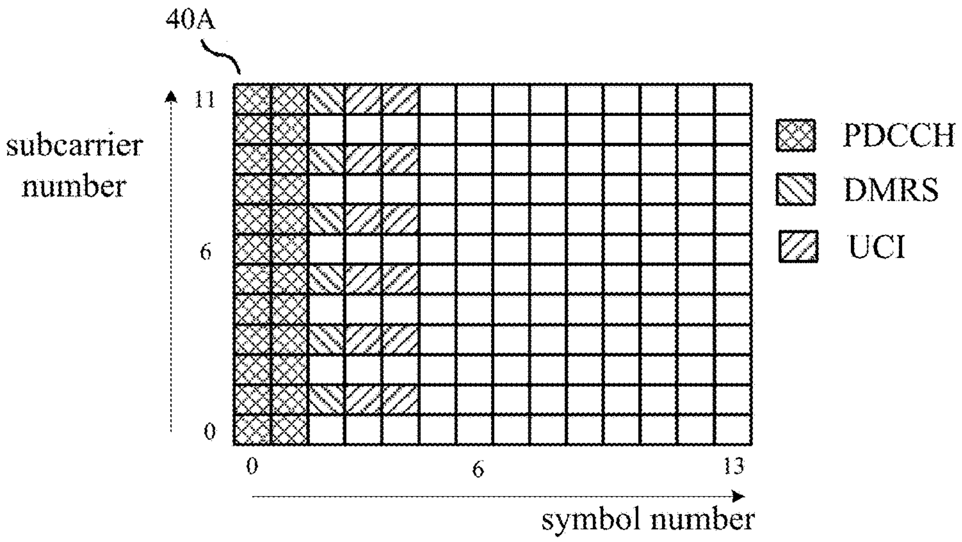
FIGS. 4A-4C schematically show some exemplary scenarios of UCI mapping in PUSCH in NR according to an embodiment of the present disclosure.
Figure 4B:
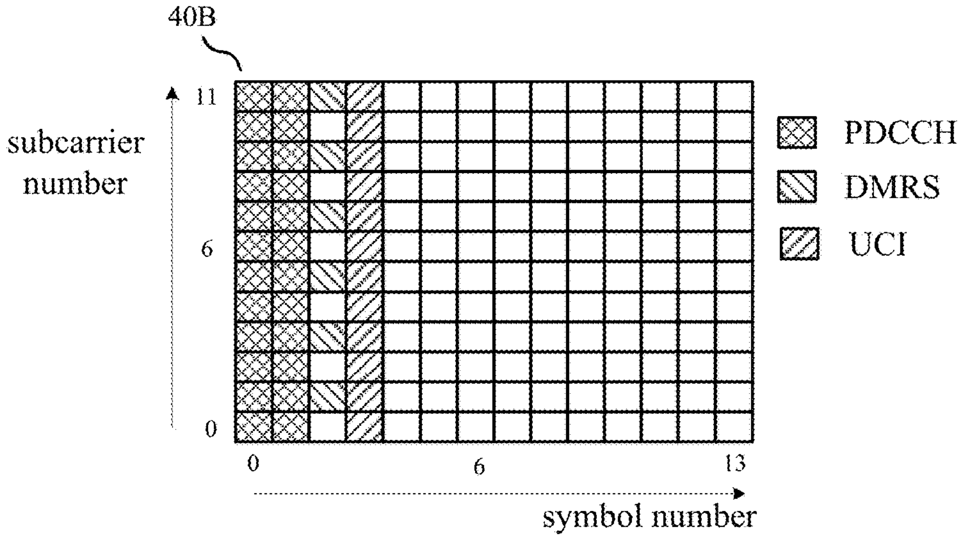
Figure 4C:
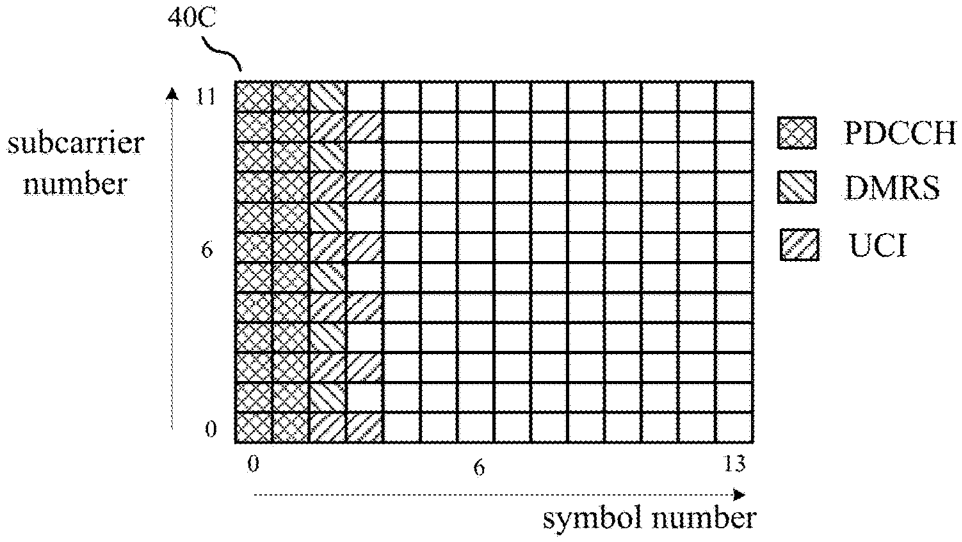

For convenience of explanation, FIG. 4 schematically shows some exemplary scenarios of UCI mapping in PUSCH in NR according to an embodiment of the present disclosure. As an example, FIG. 4 corresponds to a case that CP-OFDM waveform is used and that the DMRS pattern is the same as that shown in FIG. 2(A) for a Comb like configuration. For example, as shown in FIG. 4(A)-(C), in PRB 40A/40B/40C, PDCCH is mapped to the first two symbols, i.e. symbols 0, 1, as shown by REs filled with cross lines. DMRSs are mapped to symbol 2 in time domain and subcarriers 1, 3, 5, 7, 9 and 11 in frequency domain, as shown by REs filled with left oblique lines.

In FIG. 4(A), UCI is mapped to same subcarriers as DMRSs, that is to say, UCI is mapped to subcarriers 1, 3, 5, 7, 9 and 11 in frequency domain. In time domain, UCI is mapped to two symbols adjacent to DMRSs, that is, symbols 3, 4. In this case, REs where UCI is mapped are two REs whose distances with REs where DMRSs are mapped are shortest in time domain (in symbol level), as shown by REs filled with right oblique lines. Here, the shortest distance with REs where DMRSs are mapped may be explained as within two symbols in time domain. Or, the granularity on distance may be two symbols for example.

Advantageously, by mapping UCI to same subcarriers as DMRSs by the circuitry 310, latency may be reduced and a better channel performance can be achieved.

The mapping of UCI is not limited to the manner shown in FIG. 4(A). As shown in FIG. 4(B), taking a RE composed of symbol 2 in time domain and subcarrier 11 in frequency domain, where DMRS is mapped, in the PRB 40B as an example, UCI is mapped to its adjacent two REs, that is, a RE composed of symbol 3 in time domain and subcarrier 11 in frequency domain and a RE composed of symbol 3 in time domain and subcarrier 10 in frequency domain, as shown by REs filled with right oblique lines. In this case, REs where UCI is mapped are two REs whose distances with REs where DMRSs are mapped are shortest in both time domain and frequency domain (in RE level). Here, the shortest distance with REs where DMRSs are mapped may be explained as within one RE, that is, one symbol in time domain and/or one subcarrier in frequency domain. Or, the granularity on distance may be one RE for example.

FIG. 4(C) further shows another manner of mapping UCI. As shown in FIG. 4(C), also taking a RE composed of symbol 2 in time domain and subcarrier 11 in frequency domain, where DMRS is mapped, in the PRB 40C as an example, UCI is mapped to its adjacent two REs, that is, a RE composed of symbol 2 in time domain and subcarrier 10 in frequency domain and a RE composed of symbol 3 in time domain and subcarrier 10 in frequency domain, as shown by REs filled with right oblique lines. In this case, REs where UCI is mapped are two REs whose distances with REs where DMRSs are mapped are shortest in both time domain and frequency domain (in RE level). Here, the shortest distance with REs where DMRSs are mapped may be explained as within one RE, that is, one symbol in time domain and/or one subcarrier in frequency domain. Or, the granularity on distance may be one RE for example.

Although both FIG. 4(B) and FIG. 4(C) map UCI to REs based on their distance with REs for DMRSs in RE level, there is a difference between them in that FIG. 4(B) considers frequency domain mapping firstly, that is, one of two REs for UCI belongs to the same subcarrier with RE for DMRS, while FIG. 4(C) considers time domain mapping firstly, that is, one of two REs for UCI belongs to the same symbol with RE for DMRS. In general, considering frequency domain mapping firstly may reduce latency and thus achieving a better channel performance.

It is noted that, FIG. 4 is only for purpose of explanation and the present disclosure is not limited thereto. As described above, the mapping of UCI may be in any other suitable manner based on distances with REs for RSs in one or more of time domain, frequency domain and spatial domain. In addition, it is noted that the granularity of distance may be configured by gNB (base station) via Radio Resource Control (RRC) signalling.

According to an embodiment of the present disclosure, mapping of UCI by the circuitry 310 varies with patterns of the reference signals.

Figure 5:
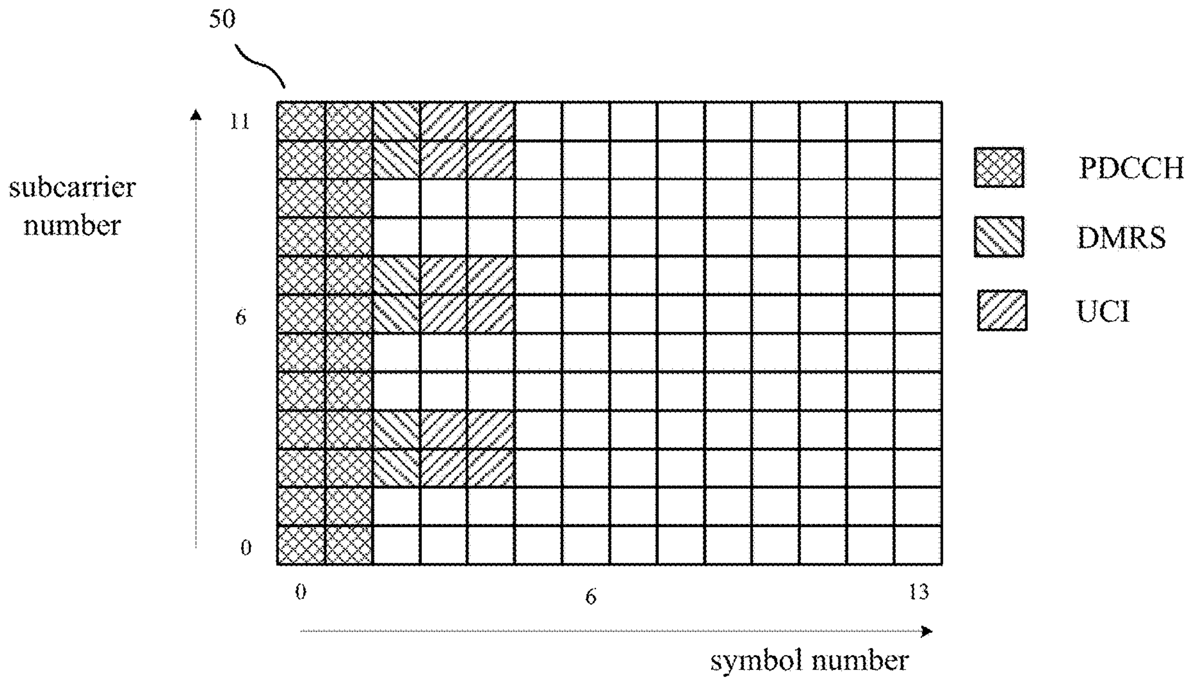
FIG. 5 schematically shows an exemplary scenario of UCI mapping in PUSCH in NR according to an embodiment of the present disclosure.

FIG. 5 schematically shows an exemplary scenario of UCI mapping in PUSCH in NR according to an embodiment of the present disclosure. FIG. 5 corresponds to a case that CP-OFDM waveform is used and that the DMRS pattern is the same as that shown in FIG. 2(B) for a length-2 FD OCC based configuration. For example, as shown in FIG. 5, in PRB 50, PDCCH is mapped to the first two symbols, i.e. symbols 0, 1, as shown by REs filled with cross lines. DMRSs are mapped to symbol 2 in time domain and consecutive subcarriers 2&3, 6&7, and 10&11 in frequency domain, as shown by REs filled with left oblique lines.

When comparing FIG. 5 with FIG. 4(A), since DMRS pattern changes from FIG. 4(A) to FIG. 5, mapping of UCI should vary accordingly. Specifically, as shown in FIG. 5, in order to keep UCI in the same subcarriers with DMRSs, UCI is mapped to subcarriers 2&3, 6&7, and 10&11 in frequency domain. In time domain, UCI is mapped to two symbols adjacent to DMRSs, that is, symbols 3, 4, which is the same as in FIG. 4(A). In this case, similarly with FIG. 4(A), REs where UCI is mapped are two REs whose distances with REs where DMRSs are mapped are shortest in time domain (in symbol level), as shown by REs filled with right oblique lines.

As described above, unlike in LTE, RS pattern may vary according to different configurations and different waveforms in NR. Thus, a better channel performance can be achieved due to mapping of UCI varying with patterns of the reference signals.

According to an embodiment of the present disclosure, UCI comprises a plurality of types of UCI, and the plurality of types of UCI are assigned with priorities respectively, and the higher the priority assigned to a type of UCI is, the shorter the distances of the one or more available resource elements, where the type of UCI is mapped, with resource elements, where reference signals are mapped, is.

Specifically, although FIGS. 4 and 5 discuss the mapping of UCI by taking UCI as general information, in practice, UCI may be subdivided into several types. Further, by prioritize different types of UCI, mapping of these different types of UCI may reflect their priorities as well. Thereby, priority of different types of UCI can be guaranteed.

More specifically, for convenience of explanation, it is assumed that the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority. That is to say, the priority order of these UCI is: HARQ-ACK→RI→Beam management/recovery→CSI. Here, Beam management/recovery is a new type of UCI designed for NR. CSI relates to CSI such as CQI/PMI.

According to an embodiment of the present disclosure, all of the plurality of types of UCI are mapped to same subcarriers, and the higher the priority assigned to a type of UCI is, the shorter the distances of the one or more available resource elements, where the type of UCI is mapped, with resource elements, where reference signals are mapped, in time domain is.

Figure 6:
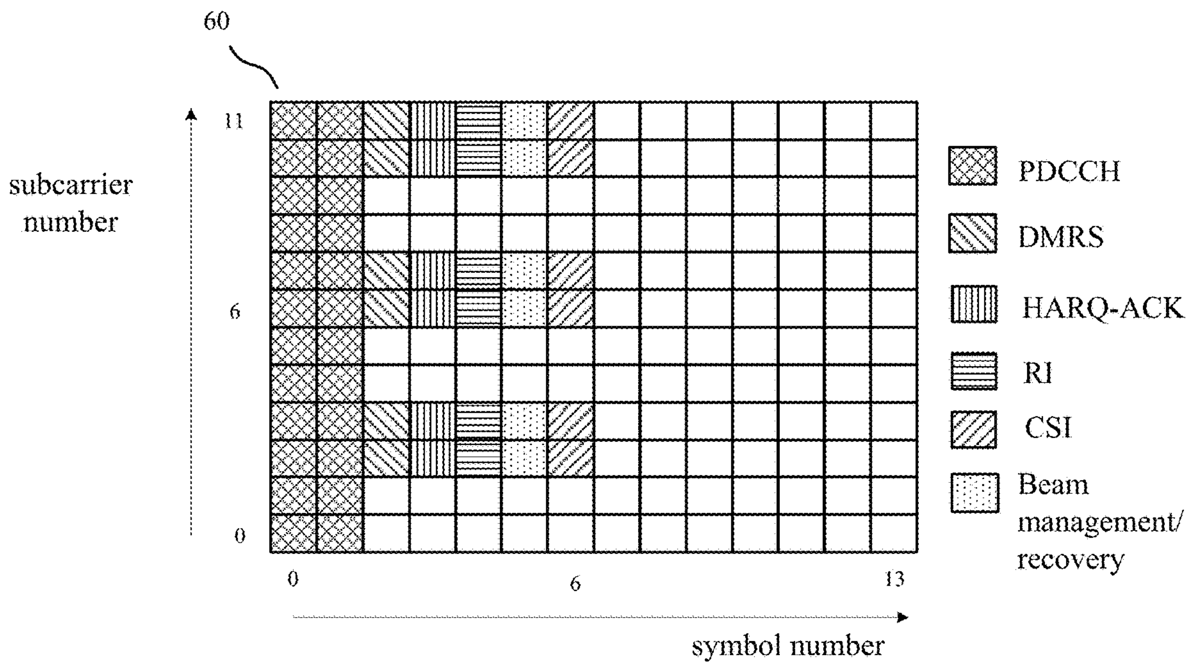
FIG. 6 schematically shows an exemplary scenario of mapping of different types of UCI in PUSCH in NR according to an embodiment of the present disclosure.

FIG. 6 schematically shows an exemplary scenario of mapping of different types of UCI in PUSCH in NR according to an embodiment of the present disclosure. FIG. 6 corresponds to a case that CP-OFDM waveform is used and that the DMRS pattern is the same as that shown in FIG. 2(B) for a length-2 FD OCC based configuration. For example, as shown in FIG. 6, in PRB 60, PDCCH is mapped to the first two symbols, i.e. symbols 0, 1, as shown by REs filled with cross lines. DMRSs are mapped to symbol 2 in time domain and consecutive subcarriers 2&3, 6&7, and 10&11 in frequency domain, as shown by REs filled with left oblique lines.

Similarly with FIG. 5, all of UCI is mapped to the same subcarriers with DMRSs, that is, to subcarriers 2&3, 6&7, and 10&11 in frequency domain. Further, the priority order of these four types of UCI is reflected by distances thereof with DMRS in time domain (in symbol level). Specifically, as shown in FIG. 6, since HARQ-ACK has the highest priority, it is mapped to symbol 3 in time domain, as shown by REs filled with vertical lines. Next, RI having the second highest priority is mapped to symbol 4 in time domain, as shown by REs filled with horizontal lines. Then, Beam management/recovery having the third highest priority is mapped to symbol 5 in time domain, as shown by REs filled with points. Finally, CSI (e.g. CQI/PMI) having the lowest priority is mapped to symbol 6, as shown by REs filled with right oblique lines. It can be seen from FIG. 6 that HARQ-ACK is closest to DMRS in time domain (in symbol level) while CSI is farthest to DMRS in time domain (in symbol level).

Here, when taking all of these four types of UCI as a whole, the shortest distance with REs where DMRSs are mapped may be explained as within four symbols in time domain. Or, the granularity on distance may be four symbols for example. More specifically, among these four types of UCI, UCI with the highest priority is mapped to a RE whose distance is within one symbol with DMRS REs, that is, has the shortest distance with DMRS REs in time domain (in symbol level), and UCI with the second highest priority is mapped to a RE whose distance is within two symbols with DMRS REs, that is, has the second shortest distance with DMRS REs in time domain (in symbol level), and so on.

As described above, by mapping all of UCI to the same subcarriers with DMRS, i.e. considering frequency domain mapping firstly, latency can be reduced. Meanwhile, priority of different types of UCI can be guaranteed.

According to an embodiment of the present disclosure, the higher the priority assigned to a type of UCI is, the shorter the distances of the one or more available resource elements, where the type of UCI is mapped, with resource elements, where reference signals are mapped, in both frequency domain and time domain is.

Figure 7:
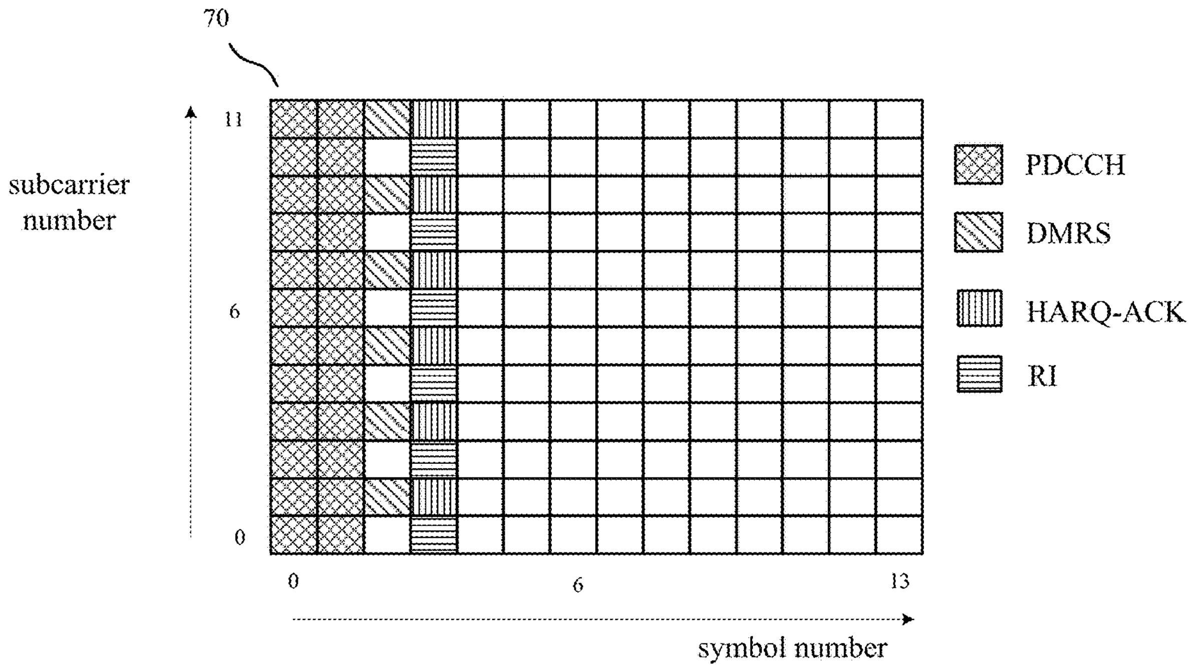
FIG. 7 schematically shows an exemplary scenario of mapping of different types of UCI in PUSCH in NR according to an embodiment of the present disclosure.

FIG. 7 schematically shows an exemplary scenario of mapping of different types of UCI in PUSCH in NR according to an embodiment of the present disclosure. FIG. 7 corresponds to a case that CP-OFDM waveform is used and that the DMRS pattern is the same as that shown in FIG. 2(A) for a Comb like configuration. For example, as shown in FIG. 7, in PRB 70, PDCCH is mapped to the first two symbols, i.e. symbols 0, 1, as shown by REs filled with cross lines. DMRSs are mapped to symbol 2 in time domain and subcarriers 1, 3, 5, 7, 9 and 11 in frequency domain, as shown by REs filled with left oblique lines.

As described above, the priority of HARQ-ACK is higher than that of RI. Thus, HARQ-ACK is mapped to the same subcarrier with DMRSs in frequency domain and to a symbol adjacent to DMRS in time domain, as shown by REs filled with vertical lines. Then, RI is mapped to a subcarrier adjacent to DMRSs in frequency domain and to the same symbol with HARQ-ACK in time domain, as shown by REs filled with horizontal lines.

When taking HARQ-ACK and RI as a whole, the manner of UCI mapping in FIG. 7 is the same as that in FIG. 4(B) in which REs where UCI is mapped are two REs whose distances with REs where DMRSs are mapped are shortest in both time domain and frequency domain (in RE level). Here, the shortest distance with REs where DMRSs are mapped may be explained as within one RE, that is, one symbol in time domain and/or one subcarrier in frequency domain. Or, the granularity on distance may be one RE for example.

In FIG. 7, the priority order of the two types of UCI is reflected by distances thereof with DMRSs in both time domain and frequency domain (in RE level), which is different from FIG. 6. Further, frequency domain mapping is considered firstly, that is to say, HARQ-ACK having a higher priority is mapped to the same subcarrier with DMRSs, latency can thus be reduced while the priority of different UCI is guaranteed. That is to say, among these two types of UCI, UCI with a higher priority is mapped to a RE whose distance is within 0 subcarrier in frequency domain and one symbol in time domain, that is, has the shortest distance with DMRS REs in both frequency domain and time domain (in RE level), while UCI with a lower priority is mapped to a RE whose distance is within one subcarrier in frequency domain and one symbol in time domain, that is, has the second shortest distance with DMRS REs in both frequency domain and time domain (in RE level).

It is noted that, although there is only two types of UCI shown in FIG. 7, the present disclosure is not limited thereto. And, when there are more types of UCI, their priority order can also be reflected by distances thereof with DMRS in both time domain and frequency domain (in RE level).

Although the described above relates to cases that there is only front-loaded DMRSs mapped in PRBs, the present disclosure can also be applied to cases that there are front-loaded DMRS and additional DMRSs.

According to an embodiment of the present disclosure, the reference signals comprise front-loaded Demodulation Reference Signals (DMRSs) and additional DMRSs, and mapping of UCI around the front-loaded DMRSs is same as or different from mapping of UCI around the additional DMRSs.

Figure 8:
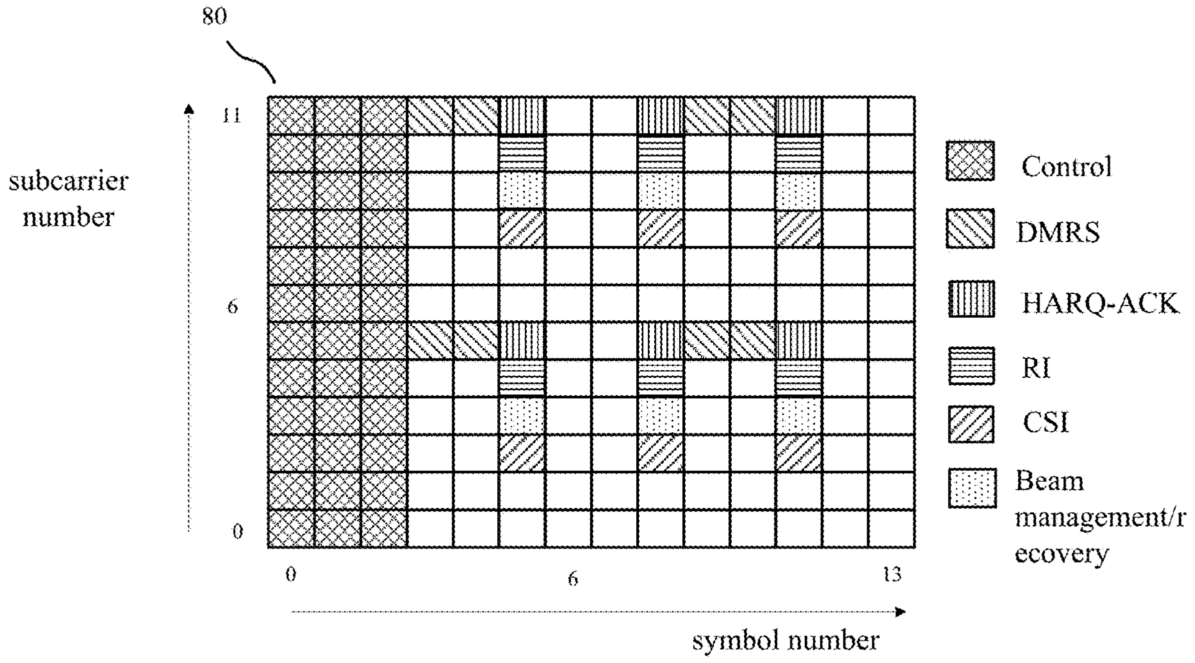
FIG. 8 schematically shows an exemplary scenario of mapping of different types of UCI in PUSCH in NR in a case of front-loaded DMRSs and additional DMRSs according to an embodiment of the present disclosure.

FIG. 8 schematically shows an exemplary scenario of mapping of different types of UCI in PUSCH in NR in a case of front-loaded DMRSs and additional DMRSs according to an embodiment of the present disclosure. In FIG. 8, it is assumed that the first three symbols in PRB 80 are used for control region, as shown by REs filled with cross lines. Front-loaded DMRSs are mapped to symbols 3, 4 in time domain and to subcarriers 5, 11 in frequency domain, and additional DMRSs are mapped to symbols 9, 10 in time domain and to subcarriers 5, 11 in frequency domain, as shown by REs filled with left oblique lines.

Taking a front-loaded DMRS (for example, a RE composed of symbol 4 and subcarrier 11) as an example, mapping of different types of UCI around it is based on distances with it in frequency domain (in subcarrier level). Specifically, as described above, the priority order of these UCI is: HARQ-ACK→RI→Beam management/recovery→CSI. Thus, HARQ-ACK having the highest priority is mapped to the same subcarrier with the front-loaded DMRS in frequency domain and to a symbol adjacent to the front-loaded DMRS in time domain, as shown by a RE filled with vertical lines. Next, RI having the second highest priority is mapped to the same symbol with HARQ-ACK in time domain and to a subcarrier adjacent to HARQ-ACK in frequency domain, as shown by a RE filled with horizontal lines. Then, Beam management/recovery having the third highest priority is mapped to the same symbol with HARQ-ACK in time domain and to a subcarrier adjacent to RI in frequency domain, as shown by a RE filled with points. Finally, CSI having the lowest priority is mapped to the same symbol with HARQ-ACK in time domain and to a subcarrier adjacent to Beam management/recovery in frequency domain, as shown by a RE filled with right oblique lines.

Thus, the priority order of these four types of UCI is reflected by their distances with the front-loaded DMRS in frequency domain (in subcarrier level). More specifically, the higher the priority of a type of UCI is, the shorter the distance of the type of UCI with the front-loaded DMRS in frequency domain (in subcarrier level) is. As described above, frequency domain mapping is considered firstly in order to reduce latency.

As shown in FIG. 8, around the additional DMRSs, the mapping of UCI is symmetric around the additional DMRSs themselves. But, the mapping of UCI around additional DMRSs is not same as that around front-loaded DMRSs. Specifically, for an additional DMRS mapped to a RE composed of symbol 9 in time domain and subcarrier 11 in frequency domain, the four types of UCI are mapped to symbol 8 in time domain while for an additional DMRS mapped to a RE composed of symbol 10 in time domain and subcarrier 11 in frequency domain, the four types of UCI are mapped to symbol 11 in time domain.

Figure 9:
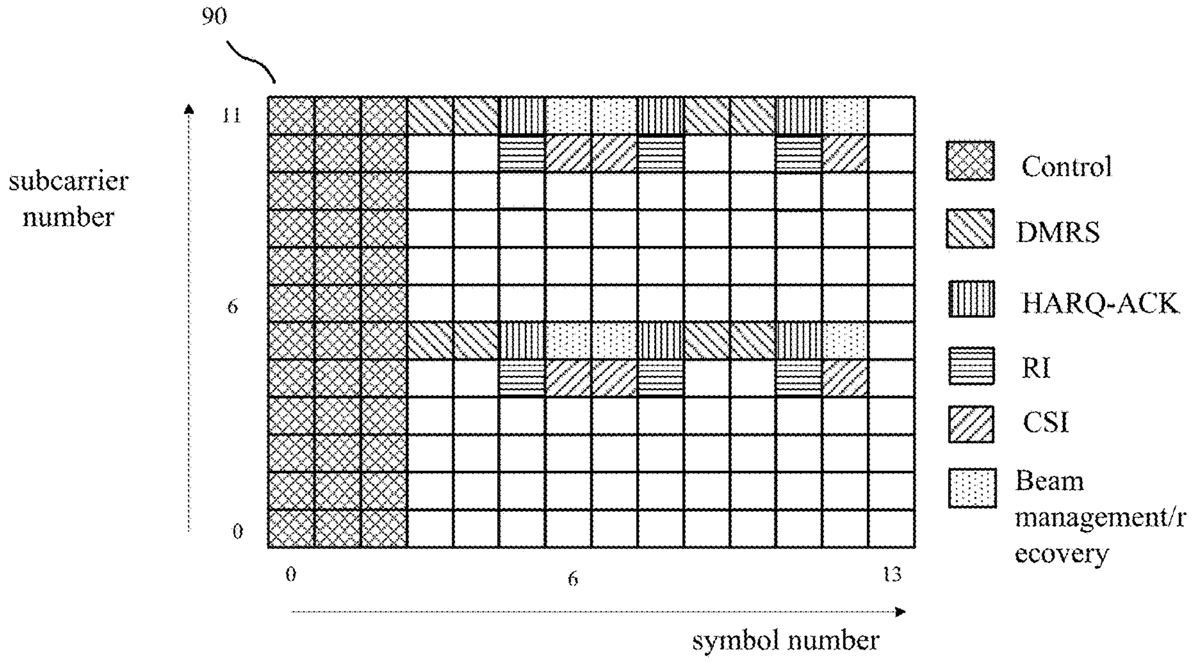
FIG. 9 schematically shows an exemplary scenario of mapping of different types of UCI in PUSCH in NR in a case of front-loaded DMRSs and additional DMRSs according to an embodiment of the present disclosure.

FIG. 9 schematically shows an exemplary scenario of mapping of different types of UCI in PUSCH in NR in a case of front-loaded DMRSs and additional DMRSs according to an embodiment of the present disclosure. Similarly with FIG. 8, it is assumed that the first three symbols in PRB 90 are used for control region, as shown by REs filled with cross lines. Front-loaded DMRSs are mapped to symbols 3, 4 in time domain and to subcarriers 5, 11 in frequency domain, and additional DMRSs are mapped to symbols 9, 10 in time domain and to subcarriers 5, 11 in frequency domain, as shown by REs filled with left oblique lines.

Taking a front-loaded DMRS (for example, a RE composed of symbol 4 and subcarrier 11) as an example, mapping of different types of UCI around it is based on distances with it in both frequency domain and time domain (in RE level). Specifically, as described above, the priority order of these UCI is: HARQ-ACK→RI→Beam management/recovery→CSI. Thus, HARQ-ACK having the highest priority is mapped to the same subcarrier with the front-loaded DMRS in frequency domain and to a symbol adjacent to the front-loaded DMRS in time domain, as shown by a RE filled with vertical lines. Next, RI having the second highest priority is mapped to the same symbol with HARQ-ACK in time domain and to a subcarrier adjacent to HARQ-ACK in frequency domain, as shown by a RE filled with horizontal lines. Then, Beam management/recovery having the third highest priority is mapped to the same subcarrier with HARQ-ACK in frequency domain and to a subcarrier adjacent to HARQ-ACK in frequency domain, as shown by a RE filled with points. Finally, CSI having the lowest priority is mapped to the same symbol with Beam management/recovery in time domain and to a subcarrier adjacent to Beam management/recovery in frequency domain, as shown by a RE filled with right oblique lines.

The principle of mapping UCI in FIG. 9 is the same as that in FIG. 7. That is, the priority order of these four types of UCI is reflected by their distance with the front-loaded DMRS in both frequency domain and time domain (in RE level). As described above, frequency domain mapping is considered firstly in order to reduce latency.

Similarly with FIG. 8, in FIG. 9, around the additional DMRSs, the mapping of UCI is symmetric around the additional DMRSs themselves. But, the mapping of UCI around additional DMRSs is not same as that around front-loaded DMRSs.

Figure 10:
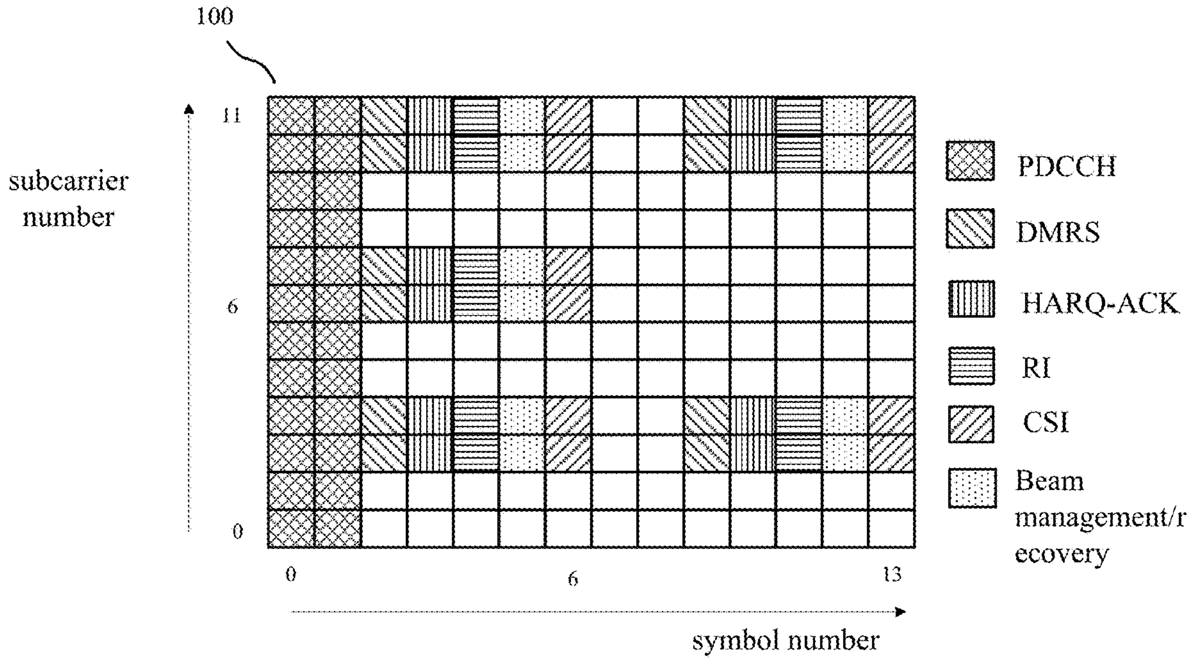
FIG. 10 schematically shows an exemplary scenario of mapping of different types of UCI in PUSCH in NR in a case of front-loaded DMRSs and additional DMRSs according to an embodiment of the present disclosure.

FIG. 10 schematically shows an exemplary scenario of mapping of different types of UCI in PUSCH in NR in a case of front-loaded DMRSs and additional DMRSs according to an embodiment of the present disclosure. FIG. 10 corresponds to a case that CP-OFDM waveform is used and that the front-loaded DMRS pattern is the similar as that shown in FIG. 2(B) for a length-2 FD OCC based configuration. For example, as shown in FIG. 10, in PRB 100, PDCCH is mapped to the first two symbols, i.e. symbols 0, 1, as shown by REs filled with cross lines. Front-loaded DMRSs are mapped to symbol 2 in time domain and consecutive subcarriers 2&3, 6&7, and 10&11 in frequency domain, as shown by REs filled with left oblique lines. In addition, there are additional DMRSs mapped to symbol 9 in time domain and consecutive subcarriers 2&3, 6&7, and 10&11 in frequency domain in PRB 100.

Around front-loaded DMRSs, since the mapping of different types of UCI is same as that in FIG. 6, details thereof will not be given any more for avoiding redundancy. Unlike FIGS. 8 and 9, in FIG. 10, mapping of UCI around additional DMRSs is the same as mapping of UCI around front-loaded DMRSs.

Although the examples described above shows only DMRS as RS, the present disclosure is not limited thereto. Generally, both DMRS and PT-RS are present in NR. It is noted that which kinds of RSs are present may be configured at base station.

According to an embodiment of the present disclosure, the reference signals comprise Demodulation Reference Signals (DMRSs) and Phase Tracking-Reference signals (PT-RSs), and UCI is mapped by the circuitry 310 only in the layer transmitting PT-RSs in a case of multiple layer transmission.

Figure 11:
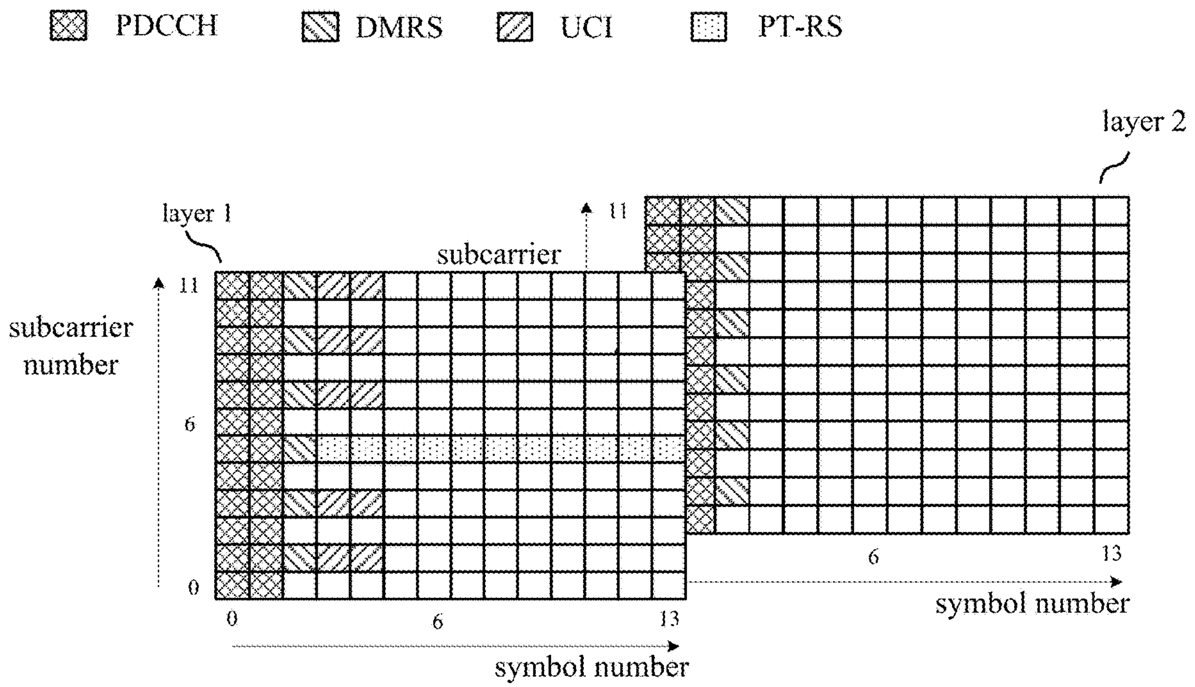
FIG. 11 schematically shows an exemplary scenario of mapping of UCI in PUSCH in NR in a case that PT-RSs are present according to an embodiment of the present disclosure.

FIG. 11 schematically shows an exemplary scenario of mapping of UCI in PUSCH in NR in a case that PT-RSs are present according to an embodiment of the present disclosure. FIG. 11 corresponds to multiple layer transmission. As described above, PT-RSs will not be transmitted in all of layers in multiple layer transmission. Here, it is assumed that UE 300 transmits two layers in total as shown in FIG. 11. For each layer, configurations of PDCCH and DMRS are the same as those in FIG. 2(A), thus details thereof is not discussed here for avoiding redundancy.

It is also assumed that only layer 1 transmits PT-RSs, as shown by REs filled with points in FIG. 11. In this case, UCI is mapped only in layer 1 in order to get better phase error compensation. Here, multiple layers represent spatial domain. This example shows that mapping of UCI is also based on distance with PT-RSs in spatial domain (in layer level).

It is noted that, although UCI is mapped to REs which is closer to REs where DMRSs are mapped than REs where PT-RSs are mapped in time domain and/or frequency domain, as shown in layer 1 in FIG. 11, the present disclosure is not limited thereto. UCI may also be mapped to REs which is closer to REs where PT-RSs are mapped than REs where DMRSs are mapped in time domain and/or frequency domain. Mapping of UCI should be decided in consideration of both latency and phase error compensation.

According to an embodiment of the present disclosure, UCI is mapped by the circuitry 310 only in PRBs having PT-RSs.

Figure 12:
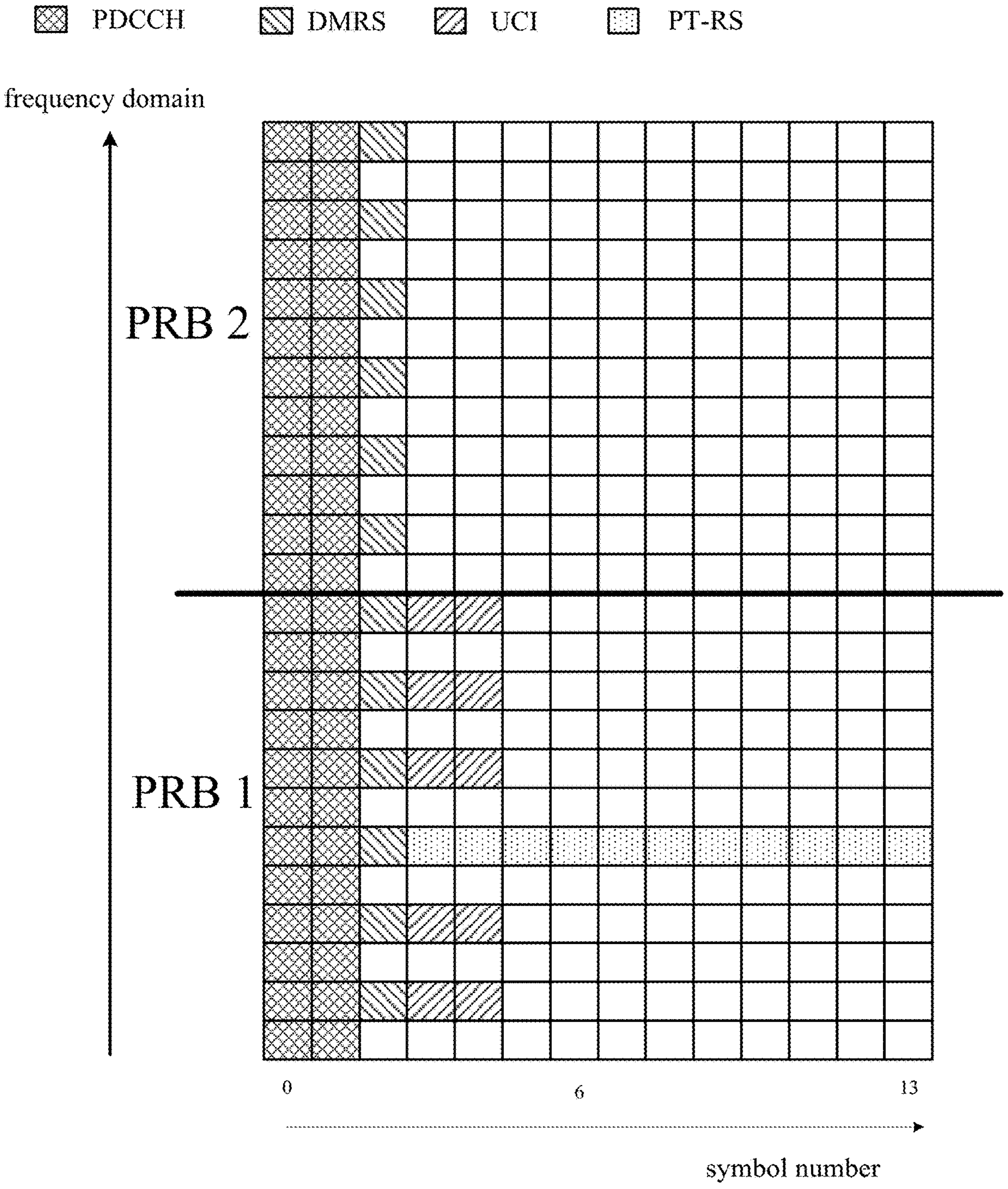
FIG. 12 schematically shows an exemplary scenario of mapping of UCI in PUSCH in NR in a case that PT-RSs are present according to an embodiment of the present disclosure.

FIG. 12 schematically shows an exemplary scenario of mapping of UCI in PUSCH in NR in a case that PT-RSs are present according to an embodiment of the present disclosure. In FIG. 12, configurations of PDCCH and DMRS are the same as those in FIG. 2(A), thus details thereof is not discussed here for avoiding redundancy.

As well known, PT-RSs may not be transmitted in all of PRBs. Here, it is assumed that UE 300 transmits PT-RSs in PRB 1 but not in PRB 2, as shown in FIG. 12. Thus, UCI is mapped only in PRB 1 but not in PRB 2 in order to get better phase error compensation.

According to an embodiment of the present disclosure, in cases of FIGS. 11 and 12, Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

Specifically, as well known, when DFT-S-OFDM in which PT-RSs are post-DFT is employed in PUSCH, DMRS and PT-RS are inserted after DFT processing, thus the operations of FIGS. 11 and 12 is not applicable. In contrast, when DFT-S-OFDM in which PT-RSs are pre-DFT is employed in PUSCH, PT-RS is inserted before DFT processing, thus the operations of FIGS. 11 and 12 is applicable.

According to an embodiment of the present disclosure, in frequency domain, UCI is evenly distributed across a PRB for PUSCH or centralized at the top and the bottom of the PRB for PUSCH.

Specifically, FIGS. 4-12 shows cases that UCI is evenly distributed across a PRB in frequency domain; however, the present disclosure is not limited thereto. UCI may also be centralized at the top and the bottom of the PRB for PUSCH in NR, like mapping of UCI shown in FIG. 1 for LTE.

It is noted that, the rule of mapping UCI adopted in the circuitry 310 may be fixed in advance, or may be configured semi-statically or dynamically by the base station.

In addition, although the above figures includes PDCCH or control regions in PRB, the present disclosure is not limited thereto, and whether PDCCH or control regions are present or not will not impact the present disclosure.

In the above, the UE 300 is described in detail with reference to FIGS. 3-12. With the UE 300, by mapping UCI to REs according to these REs' distances with REs where RSs are mapped in one or more of time domain, frequency domain and spatial domain, RS collision may be avoided and system performance may be improved in NR.

Figure 13:
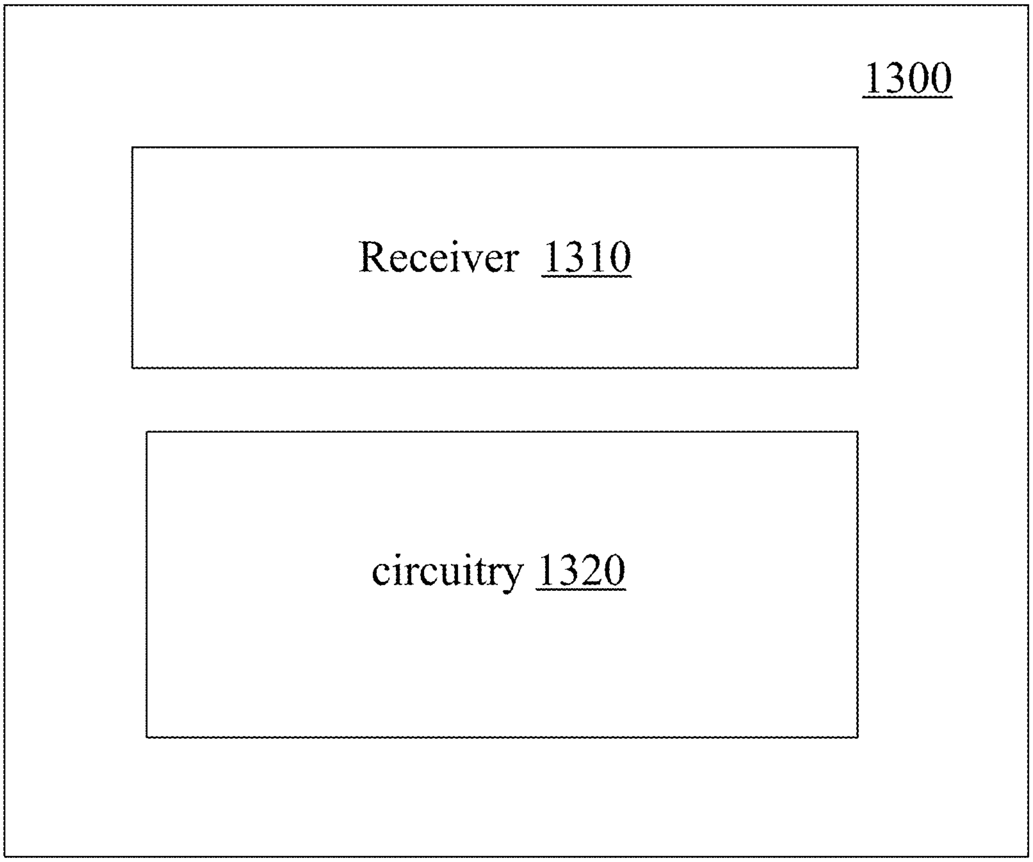
FIG. 13 illustrates a block diagram of a part of a base station according to an embodiment of the present disclosure.

In another embodiment of the present disclosure, there is provided a base station as shown in FIG. 13. FIG. 13 illustrates a block diagram of a part of a base station 1300 according to an embodiment of the present disclosure. As shown in FIG. 13, the base station 1300 includes a receiver 1310 and circuitry 1320. The receiver 1310 is operative to receive Uplink Control Information (UCI) and reference signals in Physical Uplink Shared Channel (PUSCH) on physical resource blocks (PRBs) for PUSCH from a user equipment. The circuitry 1320 is operative to demap the UCI and the references signals from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain. For example, the user equipment may be the UE 300 as shown in FIG. 3.

According to an embodiment of the present disclosure, the demapping rule further indicates that UCI is mapped to one or more available resource elements whose distances with resource elements where reference signals are mapped are shortest in one or more of time domain, frequency domain and spatial domain.

According to an embodiment of the present disclosure, the reference signals comprise Demodulation Reference Signals (DMRSs) and Phase Tracking-Reference signals (PT-RSs), and the demapping rule further indicates that UCI is mapped only in the layer transmitting PT-RSs in a case of multiple layer transmission.

According to an embodiment of the present disclosure, the demapping rule further indicates that UCI is mapped only in PRBs having PT-RSs.

According to an embodiment of the present disclosure, Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

According to an embodiment of the present disclosure, the reference signals comprise Demodulation Reference Signals (DMRSs), and the demapping rule further indicates that UCI is mapped to same subcarriers as DMRSs.

According to an embodiment of the present disclosure, mapping of UCI varies with patterns of the reference signals.

According to an embodiment of the present disclosure, UCI comprises a plurality of types of UCI, and the plurality of types of UCI are assigned with priorities respectively, and the higher the priority assigned to a type of UCI is, the shorter the distances of the one or more available resource elements, where the type of UCI is mapped, with resource elements, where reference signals are mapped, is.

According to an embodiment of the present disclosure, the demapping rule further indicates that all of the plurality of types of UCI are mapped to same subcarriers, and that the higher the priority assigned to a type of UCI is, the shorter the distances of the one or more available resource elements, where the type of UCI is mapped, with resource elements, where reference signals are mapped, in time domain is.

According to an embodiment of the present disclosure, the demapping rule further indicates that the higher the priority assigned to a type of UCI is, the shorter the distances of the one or more available resource elements, where the type of UCI is mapped, with resource elements, where reference signals are mapped, in both frequency domain and time domain is.

According to an embodiment of the present disclosure, the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority.

According to an embodiment of the present disclosure, the reference signals comprise front-loaded Demodulation Reference Signals (DMRSs) and additional DMRSs, and mapping of UCI around the front-loaded DMRSs is same as or different from mapping of UCI around the additional DMRSs.

According to an embodiment of the present disclosure, in frequency domain, UCI is evenly distributed across a PRB for PUSCH or centralized at the top and the bottom of the PRB for PUSCH.

With the BS 1300, by mapping UCI to REs according to these REs' distances with REs where RSs are mapped in one or more of time domain, frequency domain and spatial domain, RS collision may be avoided and system performance may be improved in NR.

Figure 14:
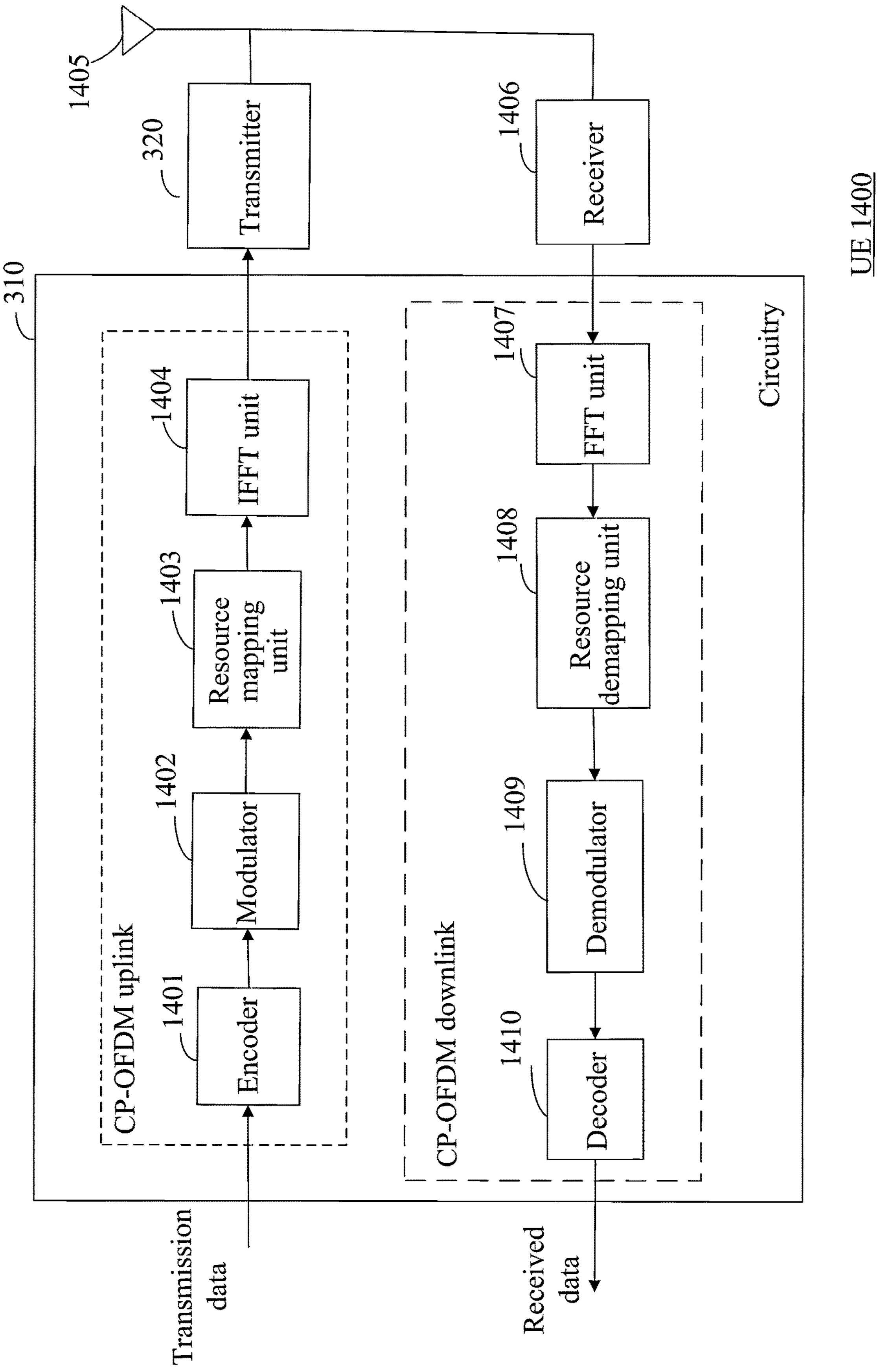
FIG. 14 illustrates a block diagram of details of a user equipment when CP-OFDM waveform is used for uplink transmission according to an embodiment of the present disclosure.

FIG. 14 illustrates a block diagram of details of a user equipment 1400 when CP-OFDM waveform is used for uplink transmission according to an embodiment of the present disclosure. As shown in FIG. 14, the user equipment 1400 may include circuitry 310, a transmitter 320, an antenna 1405 and a receiver 1406. The circuitry 310 of the UE 1400 may include an encoder 1401, a modulator 1402, a resource mapping unit 1403, and an IFFT (Inverse Fast Fourier Transform) unit 1404 for uplink transmission. In addition, the circuitry 310 of the UE 1400 may further include an FFT (Fast Fourier Transform) unit 1407, a resource demapping unit 1408, a demodulator 1409 and a decoder 1410 for downlink reception.

Of these constituent elements, the circuitry 310 functions mainly as the circuitry 310 shown in FIG. 3, and the transmitter 320 functions mainly as the transmitter 320 shown in FIG. 3. Thus, elements having similar functions as those in FIG. 3 are labeled the same and will not be repetitively described herein for purpose of brevity and clarity.

The encoder 1401 encodes the transmission data and outputs the encoded data to the modulator 1402. The modulator 1402 modulates the encoded data and outputs the modulated data to the resource mapping unit 1403.

The resource mapping unit 1403 maps the modulated data to REs for data transmission in PRBs for PUSCH and maps RSs (for example, DMRSs and/or PT-RSs) to REs for RSs in the PRBs. In addition, the resource mapping unit 1403 maps, in the PRBs for PUSCH, UCI to one or more available REs according to their distances with REs where RSs are mapped in one or more of time domain, frequency domain and spatial domain. The detailed operation of UCI mapping has been described in detail with reference to FIGS. 4-12, therefore, the details thereof are omitted for the purpose of clarity and brevity.

The IFFT unit 1404 performs IFFT processing on a plurality of subcarriers in the PRBs to which data, RSs and UCI are mapped, and output the signals after the IFFT processing to the transmitter 320. The transmitter 320 outputs the signals to a base station via the antenna 1405.

The receiver 1406 receives downlink signals transmitted from a base station via the antenna 1405. Since only CP-OFDM waveform is used for downlink transmission in NR, the FFT unit 1407, the resource demapping unit 1408, the demodulator 1409 and the decoder 1410 are used to perform a series of signal processing on the downlink signals received by the receiver 1406 and obtains the received data finally. It is noted that, since the operations of the FFT unit 1407, the resource demapping unit 1408, the demodulator 1409 and the decoder 1410 are well known by those skilled in the art, the details thereof will not be discussed here for avoiding confusion of the inventive points of the present disclosure.

To be noted that, although FIG. 14 shows the parts, i.e., the encoder 1401, the modulator 1402, the resource mapping unit 1403, the IFFT unit 1404, the FFT unit 1407, the resource demapping unit 1408, the demodulator 1409 and the decoder 1410 are within the circuitry 310, this is only an example, but not a limitation. In fact, for example, one or more of the integrated parts may be separated from the circuitry 310 depending on specific requirements.

Figure 15:
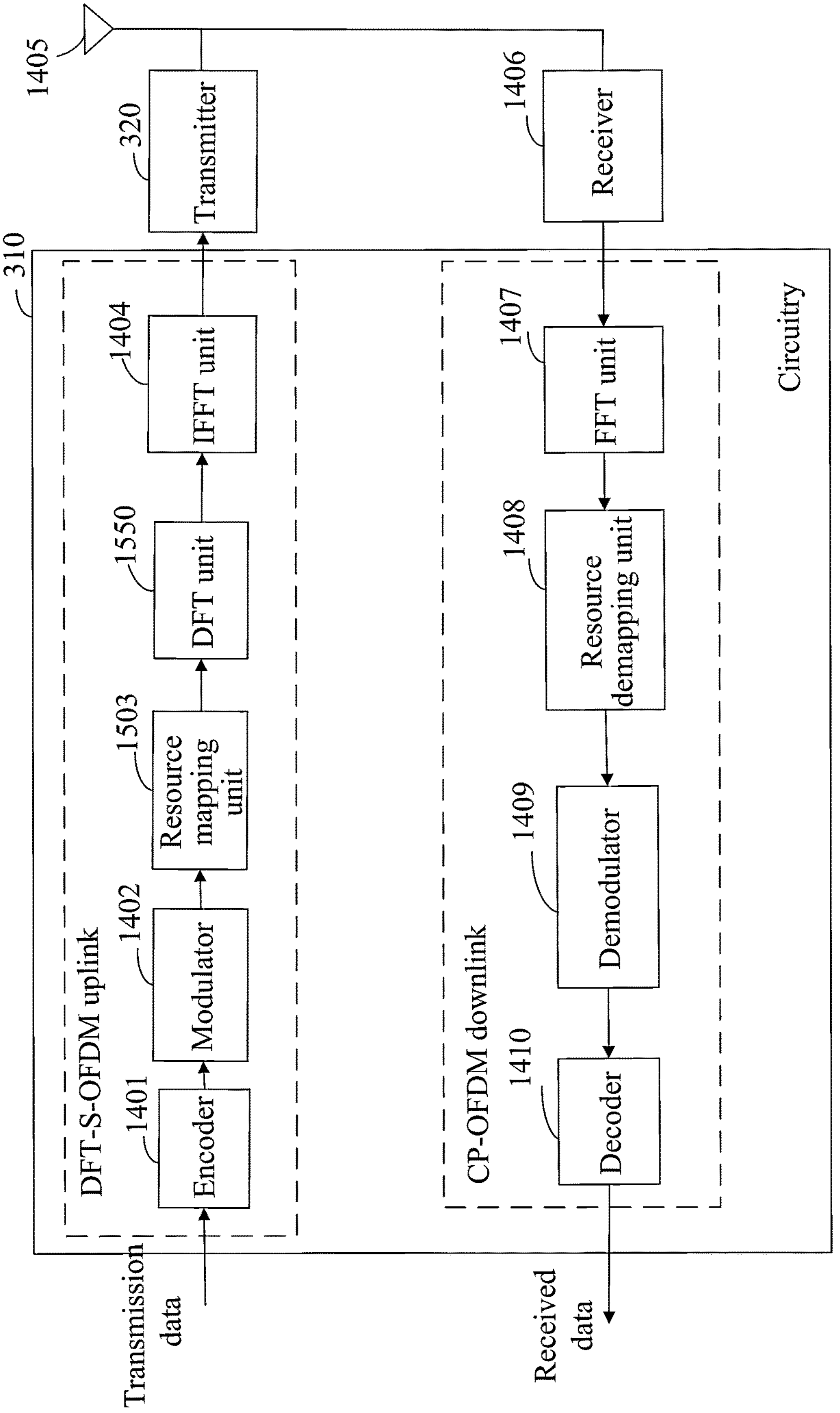
FIG. 15 illustrates a block diagram of details of a user equipment when DFT-S-OFDM waveform is used for uplink transmission according to an embodiment of the present disclosure.

FIG. 15 illustrates a block diagram of details of a user equipment 1500 when DFT-S-OFDM waveform is used for uplink transmission according to an embodiment of the present disclosure. As shown in FIG. 15, the user equipment 1500 may include circuitry 310, a transmitter 320, an antenna 1405 and a receiver 1406. The circuitry 310 of the UE 1500 may further include an encoder 1401, a modulator 1402, a resource mapping unit 1503, a DFT unit 1550 and an IFFT unit 1404 for uplink transmission. In addition, the circuitry 310 of the UE 1500 may further include an FFT unit 1407, a resource demapping unit 1408, a demodulator 1409 and a decoder 1410 for downlink reception.

Of these constituent elements, the circuitry 310 functions mainly as the circuitry 310 shown in FIG. 3, the transmitter 320 functions mainly as the transmitter 320 shown in FIG. 3. Thus, elements having similar functions as those in FIG. 3 are labeled the same and will not be repetitively described herein for purpose of brevity and clarity. Similarly, since the operations of the encoder 1401, the modulator 1402, the IFFT unit 1404, the FFT unit 1407, the resource demapping unit 1408, the demodulator 1409 and the decoder 1410 are the same as those shown in FIG. 14, elements having similar functions as those in FIG. 14 are labeled the same and will not be repetitively described herein for purpose of brevity and clarity. The difference of FIG. 15 from FIG. 14 is the resource mapping unit 1503 and the newly added DFT unit 1550, and these two units will be described in the following.

When DFT-S-OFDM in which PT-RSs are pre-DFT is employed in PUSCH, the resource mapping unit 1503 maps the modulated data from the modulator 1402 to REs for data transmission in PRBs for PUSCH and maps PT-RSs to REs for PT-RSs in the PRBs. In addition, the resource mapping unit 1503 maps, in the PRBs for PUSCH, UCI to one or more available REs according to their distances with REs where RSs are mapped in one or more of time domain, frequency domain and spatial domain. The detailed operation of UCI mapping has been described in detail with reference to FIGS. 4-12, therefore, the details thereof are omitted for the purpose of clarity and brevity.

The DFT unit 1550 performs DFT processing on a plurality of subcarriers in the PRBs to which data, PT-RSs and UCI are mapped, and output the signals after the DFT processing to the IFFT unit 1404. After the DFT processing by the DFT unit 1550, DMRSs are inserted (mapped) into REs for DMRSs in the PRBs after the DFT processing. Then, the IFFT unit 1404 performs IFFT processing on a plurality of subcarriers in the PRBs to which data, RSs (including DMRSs and PT-RSs) and UCI are mapped, and output the signals after the IFFT processing to the transmitter 320. The transmitter 320 outputs the signals to a base station via the antenna 1405.

When DFT-S-OFDM in which PT-RSs are post-DFT is employed in PUSCH, the resource mapping unit 1503 maps the modulated data from the modulator 1402 to REs for data transmission in PRBs for PUSCH. In addition, the resource mapping unit 1503 maps, in the PRBs for PUSCH, UCI to one or more available REs according to their distances with REs where RSs (for example, DMRSs and/or PT-RSs) are mapped in one or more of time domain, frequency domain and spatial domain.

The DFT unit 1550 performs DFT processing on a plurality of subcarriers in the PRBs to which data and UCI are mapped, and output the signals after the DFT processing to the IFFT unit 1404. After the DFT processing by the DFT unit 1550, both DMRSs and PT-RSs are inserted (mapped) into REs for them in the PRBs after the DFT processing. Then, the IFFT unit 1404 performs IFFT processing on a plurality of subcarriers in the PRBs to which data, RSs (including DMRSs and PT-RSs) and UCI are mapped, and output the signals after the IFFT processing to the transmitter 320. The transmitter 320 outputs the signals to a base station via the antenna 1405.

It is noted that, as described before, since PT-RSs are inserted after the DFT processing when DFT-S-OFDM in which PT-RSs are post-DFT is employed in PUSCH, the operations of UCI mapping shown in FIGS. 11 and 12 are not suitable in this case. The operations of UCI mapping shown in FIGS. 4-10 are still applicable in this case, and since they have been described in detail in the above, the details thereof are omitted for the purpose of clarity and brevity.

To be noted that although FIG. 15 shows the parts, i.e., the encoder 1401, the modulator 1402, the resource mapping unit 1503, the DFT unit 1550, the IFFT unit 1404, the FFT unit 1407, the resource demapping unit 1408, the demodulator 1409 and the decoder 1410 are within the circuitry 310, this is only an example, but not a limitation. In fact, for example, one or more of the integrated parts may be separated from the circuitry 310 depending on specific requirements.

Figure 16:
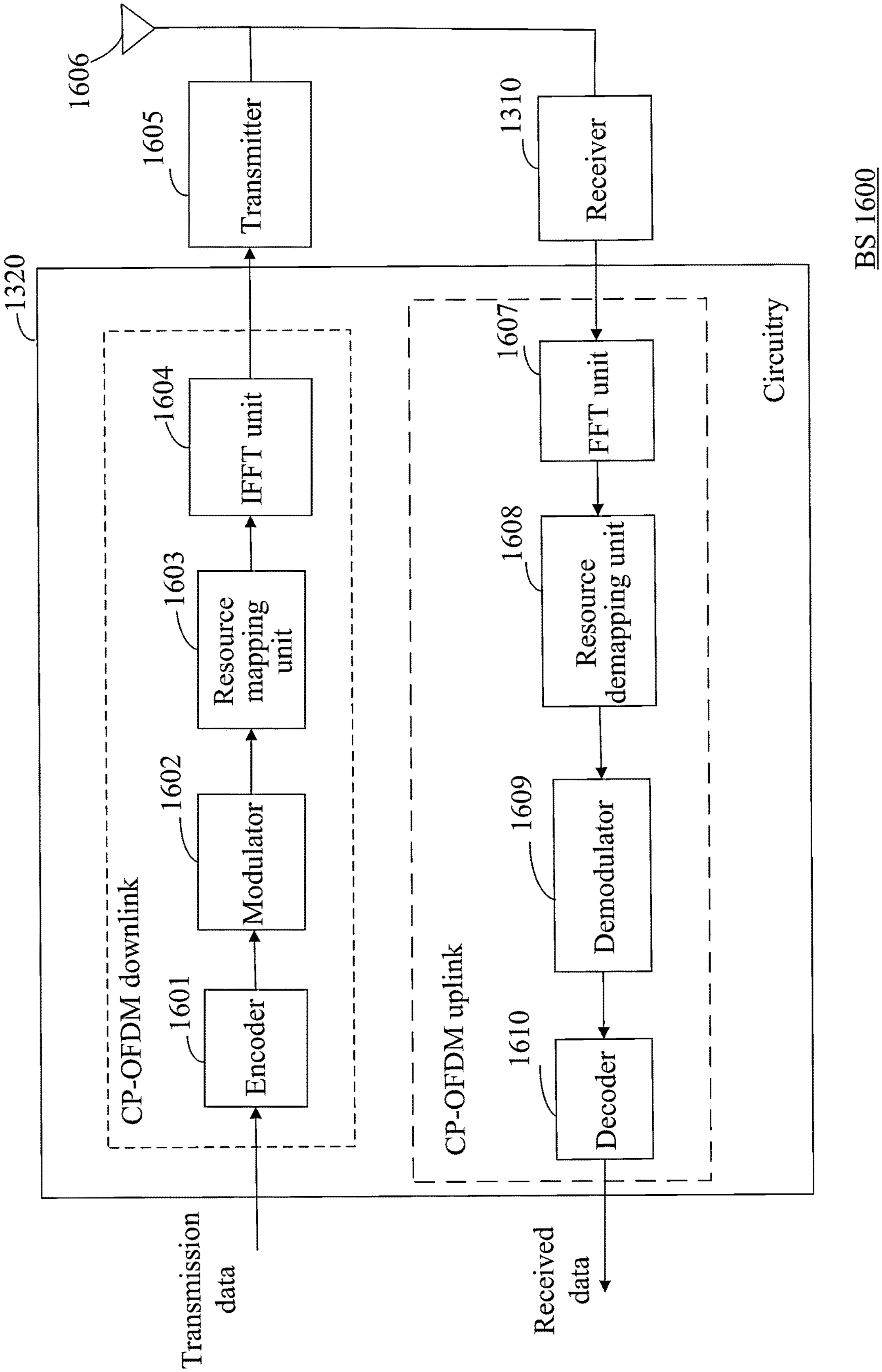
FIG. 16 illustrates a block diagram of details of a base station when CP-OFDM waveform is used for uplink transmission according to an embodiment of the present disclosure.

FIG. 16 illustrates a block diagram of details of a base station 1600 when CP-OFDM waveform is used for uplink transmission according to an embodiment of the present disclosure. As shown in FIG. 16, the base station 1600 may include a receiver 1310, circuitry 1320, a transmitter 1605 and an antenna 1606. The circuitry 1320 of the BS 1600 may further include an FFT (Fast Fourier Transform) unit 1607, a resource demapping unit 1608, a demodulator 1609 and a decoder 1610 for uplink reception. In addition, the circuitry 1320 of the BS 1600 may further include an encoder 1601, a modulator 1602, a resource mapping unit 1603 and an IFFT unit 1604 for downlink transmission.

Of these constituent elements, the receiver 1310 functions mainly as the receiver 1310 shown in FIG. 13, and the circuitry 1320 functions mainly as the circuitry 1320 shown in FIG. 13. Thus, elements having similar functions as those in FIG. 13 are labeled the same and will not be repetitively described herein for purpose of brevity and clarity.

The receiver 1310 receives from the antenna 1606 UCI and RSs (for example, DMRSs and/or PT-RSs) in PUSCH on PRBs for PUSCH from a user equipment (for example, the UE 1400 as shown in FIG. 14). Since the signals received by the receiver 1310 are signals after FFT processing transmitted from the UE, the FFT unit 1607 performs FFT processing on the received signals and outputs the signals after FFT processing to the resource demapping unit 1608.

The resource demapping unit 1608 demaps the UCI and the RSs from their respective REs in the PRBs according to a demapping rule which indicates that UCI is mapped, in the PRBs, to one or more available REs according to their distances with REs where RSs are mapped in one or more of time domain, frequency domain and spatial domain. Apparently, the resource demapping unit 1608 also demaps data from REs for data transmission in the PRBs.

The demodulator 1609 receives the demapped data from the resource demapping unit 1608, demodulates the demapped data and outputs the demodulated data to the decoder 1610. The deconder 1610 decodes the demodulated data from the demodulator 1609 and obtains the received data.

Since only CP-OFDM waveform is used for downlink transmission in NR, the encoder 1601, the modulator 1602, the resource mapping unit 1603 and the IFFT unit 1604 are used to generate downlink signals to be transmitted by the transmitter 1605. Then, the transmitter 1605 transmits the downlink signals to a user equipment (for example, UE 300, UE 1400) via the antenna 1606. It is noted that, since the operations of the encoder 1601, the modulator 1602, the resource mapping unit 1603 and the IFFT unit 1604 are well known by those skilled in the art, the details thereof will not be discussed here for avoiding confusion of the inventive points of the present disclosure.

The detailed operation of UCI mapping has been described in detail with reference to FIGS. 4-12, therefore, the details thereof are omitted for the purpose of clarity and brevity. To be noted that, although FIG. 16 shows the parts, i.e., the encoder 1601, the modulator 1602, the resource mapping unit 1603, the IFFT unit 1604, the FFT unit 1607, the resource demapping unit 1608, the demodulator 1609 and the decoder 1610 are within the circuitry 1320, this is only an example, but not a limitation. In fact, for example, one or more of the integrated parts may be separated from the circuitry 1320 depending on specific requirements.

Figure 17:
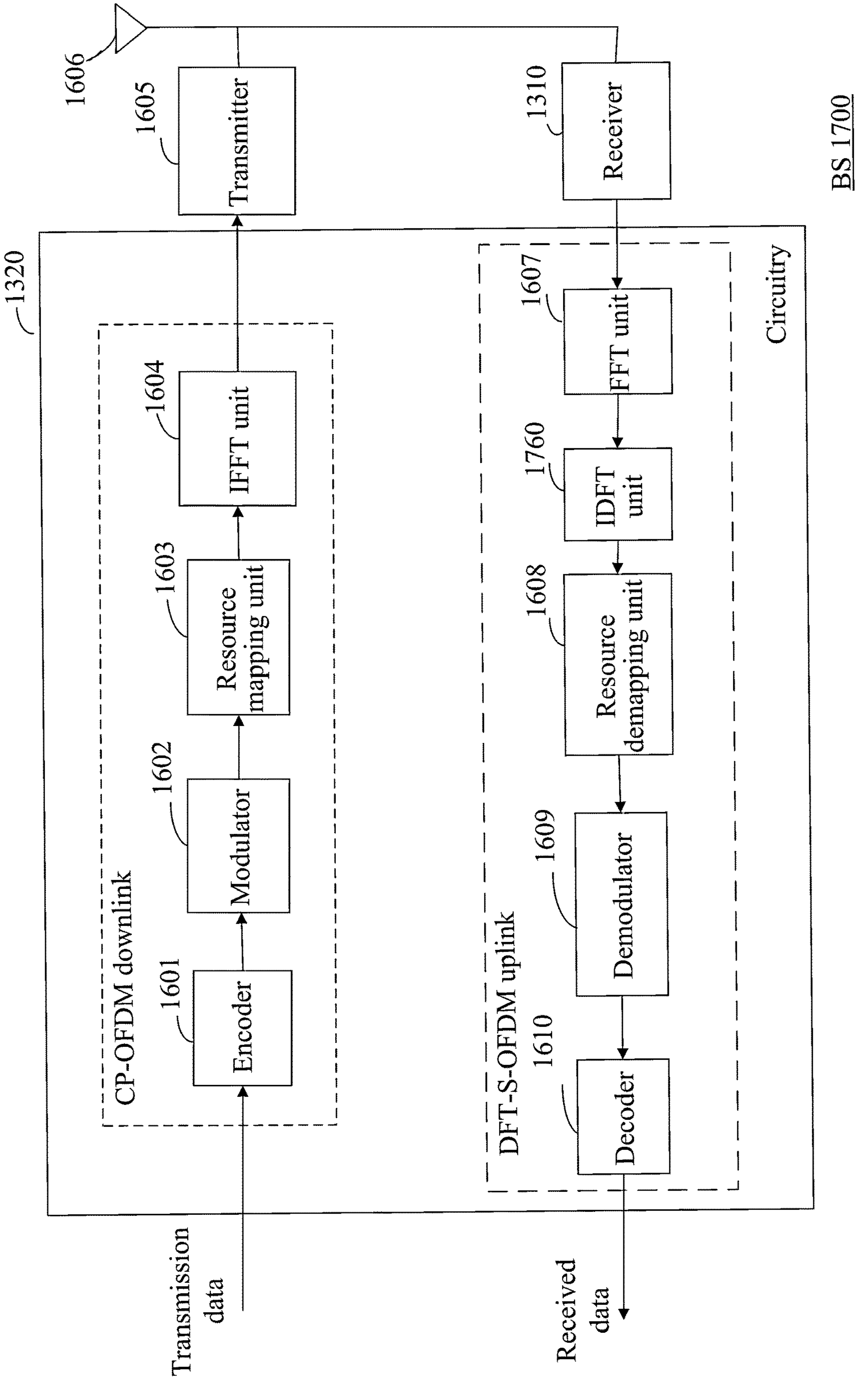
FIG. 17 illustrates a block diagram of details of a base station when DFT-S-OFDM waveform is used for uplink transmission according to an embodiment of the present disclosure.

FIG. 17 illustrates a block diagram of details of a base station 1700 when DFT-S-OFDM waveform is used for uplink transmission according to an embodiment of the present disclosure. As shown in FIG. 17, the base station 1700 may include a receiver 1310, circuitry 1320, a transmitter 1605 and an antenna 1606. The circuitry 1320 of the BS 1700 may further include an FFT unit 1607, an IDFT (Inverse Discrete Fourier Transform) unit 1760, a resource demapping unit 1608, a demodulator 1609 and a decoder 1610 for uplink reception. In addition, the circuitry 1320 of the BS 1700 may further include an encoder 1601, a modulator 1602, a resource mapping unit 1603 and an IFFT unit 1604 for downlink transmission.

Of these constituent elements, the receiver 1310 functions mainly as the receiver 1310 shown in FIG. 13, and the circuitry 1320 functions mainly as the circuitry 1320 shown in FIG. 13. Thus, elements having similar functions as those in FIG. 13 are labeled the same and will not be repetitively described herein for purpose of brevity and clarity. Similarly, since the operations of the encoder 1601, the modulator 1602, the resource mapping unit 1603, the IFFT unit 1604, the FFT unit 1607, the resource demapping unit 1608, the demodulator 1609 and the decoder 1610 are the same as those shown in FIG. 16, elements having similar functions as those in FIG. 16 are labeled the same and will not be repetitively described herein for purpose of brevity and clarity. The difference of FIG. 17 from FIG. 16 is the newly added IDFT unit 1760, this is because signals received from a user equipment (for example, the UE 1500 as shown in FIG. 5) has been subject to DFT processing at the UE side.

Specifically, after the FFT unit 1607 performs FFT processing on the received signals from the UE, the IDFT unit 1760 further performs IDFT processing on the signals after FFT processing and outputs the signals after IDFT processing to the resource demapping unit 1608.

Then, the resource demapping unit 1608 demaps the UCI and the RSs from their respective REs in the PRBs according to a demapping rule which indicates that UCI is mapped, in the PRBs, to one or more available REs according to their distances with REs where RSs are mapped in one or more of time domain, frequency domain and spatial domain. Apparently, the resource demapping unit 1608 also demaps data from REs for data transmission in the PRBs. The demodulator 1609 receives the demapped data from the resource demapping unit 1608, demodulates the demapped data and outputs the demodulated data to the decoder 1610. The decoder 1610 decodes the demodulated data from the demodulator 1609 and obtains the received data.

The detailed operation of UCI mapping has been described in detail with reference to FIGS. 4-12, therefore, the details thereof are omitted for the purpose of clarity and brevity. As described above, the operations of UCI mapping shown in FIGS. 11 and 12 are not suitable in a case that DFT-S-OFDM in which PT-RSs are post-DFT is employed in PUSCH.

To be noted that, although FIG. 17 shows the parts, i.e., the encoder 1601, the modulator 1602, the resource mapping unit 1603, the IFFT unit 1604, the FFT unit 1607, the IDFT unit 1760, the resource demapping unit 1608, the demodulator 1609 and the decoder 1610 are within the circuitry 1320, this is only an example, but not a limitation. In fact, for example, one or more of the integrated parts may be separated from the circuitry 1320 depending on specific requirements.

Figure 18:
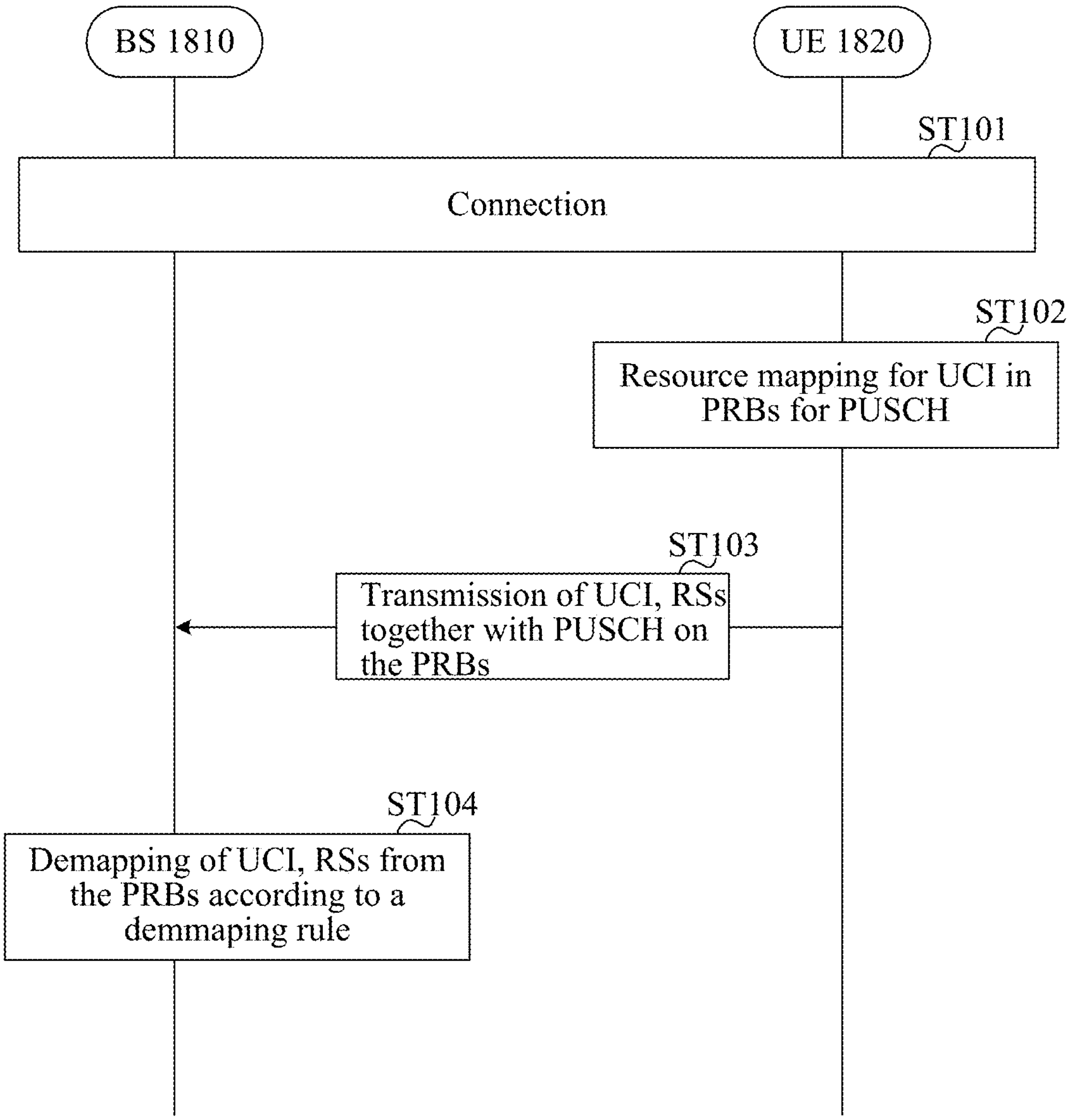
FIG. 18 schematically shows an example of a flowchart of communication between a base station and a terminal according to an embodiment of the present disclosure.

FIG. 18 schematically shows an example of a flowchart of communication between a BS 1810 and a UE 1820 according to an embodiment of the present disclosure. For example, the BS 1810 may be the BS 1300 as shown in FIG. 13 and the UE 1820 may be the UE 300 as shown in FIG. 3. More specifically, when CP-OFDM waveform is used for uplink in NR, the BS 1810 may be the BS 1600 as shown in FIG. 16 and the UE 1820 may be the UE 1400 as shown in FIG. 14. Otherwise, when DFT-S-OFDM waveform is used for uplink in NR, the BS 1810 may be the BS 1700 as shown in FIG. 17 and the UE 1820 may be the UE 1500 as shown in FIG. 15.

At a step ST101, the UE 1820 connects with the BS 1810 in a connection procedure. The connection may be established by implementing known or future developed method whose details are omitted herein.

At a step ST102, the UE 1820 maps, in PRBs for PUSCH, UCI to one or more available REs according to their distances with REs where RSs are mapped in one or more of time domain, frequency domain and spatial domain. As described above, the UE 1820 may include the circuitry 310 as the UE 300 shown in FIG. 3, and the step ST102 may be performed by the circuitry 310.

At a step ST103, the UE 1820 transmits the UCI and the RSs in PUSCH on the PRBs to the BS 1810. As described above, the UE 1820 may also include the transmitter 320 as the UE 300 shown in FIG. 3, and the step ST103 may be performed by the transmitter 310. Meanwhile, although not shown in FIG. 18, the BS 1810 receives the UCI and the RSs in PUSCH on the PRBs from the UE 1820.

At a step ST 104, the BS 1810 demaps the UCI and the RSs from their respective REs in the PRBs according to a demapping rule. The demapping rule indicates that UCI is mapped, in the PRBs, to one or more available REs according to their distances with REs where RSs are mapped in one or more of time domain, frequency domain and spatial domain. That is to say, the demapping rule tell the BS 1810 how the UCI and RSs are mapped to uplink physical resouces at the UE side. As described above, the BS 1810 may include the circuitry 1320 as the BS 1300 shown in FIG. 13, and the step ST104 may be performed by the circuitry 1320.

It is noted that, although not shown in FIG. 18, mapping and demapping of PUSCH data are apparently implemented at the UE 1820 and the BS 1820 respectively. Since mapping and demapping of PUSCH data are well known for those skilled in the art, the details thereof is not discussed herein in order to avoiding confusion of inventive points of the present disclosure.

Furthermore, as described above, the rule of mapping UCI adopted in the UE 1820 may be fixed in advance, that is, known by both the BS 1810 and the UE 1820 in advance. Alternatively, the rule of mapping UCI adopted in the UE 1820 may be configured semi-statically or dynamically by the base station. In this case, although not shown in FIG. 18, the BS 1810 may notify the UE 1820 of the rule of mapping UCI by explicit or implicit signaling.

Figure 19:
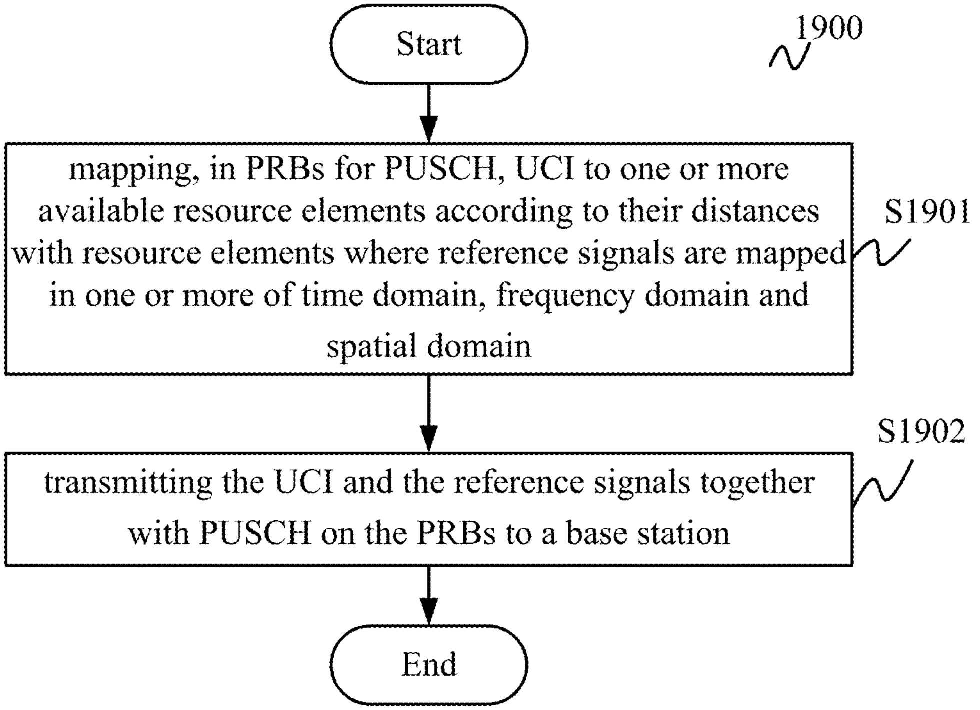
FIG. 19 illustrates a flowchart of a wireless communication method for a user equipment according to an embodiment of the present disclosure.

In a further embodiment of the present disclosure, there is provided a wireless communication method for a user equipment as shown in FIG. 19. FIG. 19 illustrates a flowchart of a wireless communication method 1900 for a user equipment according to an embodiment of the present disclosure. For example, the wireless communication method 1900 may be applied to the user equipment 300/1400/1500 as shown in FIGS. 3, 14, 15.

As shown in FIG. 19, the wireless communication method 1900 starts at a step S1901 in which, in physical resource blocks (PRBs) for Physical Uplink Shared Channel (PUSCH), Uplink Control Information (UCI) is mapped to one or more available resource elements according to their distances with resource elements where reference signals are mapped in one or more of time domain, frequency domain and spatial domain. Then, at a step S1902, the UCI and the reference signals is transmitted in PUSCH on the PRBs to a base station. After the step S1902, the wireless communication method 1900 is ended.

With the wireless communication method 1900, by mapping UCI to REs according to these REs' distances with REs where RSs are mapped in one or more of time domain, frequency domain and spatial domain, RS collision may be avoided and system performance may be improved in NR.

Note that, the other technical features in the user equipment 300 as described above can also be incorporated in the wireless communication method 1900 and will not be described here for avoid redundancy.

Figure 20:
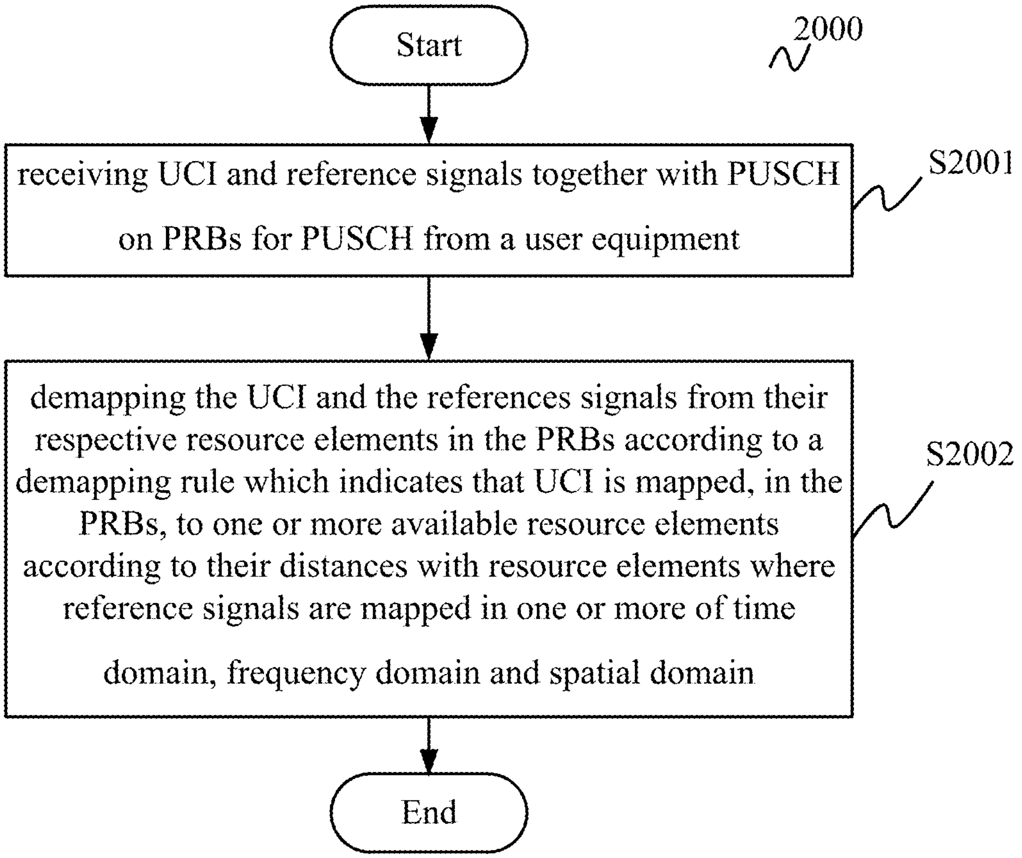
FIG. 20 illustrates a flowchart of a wireless communication method for a base station according to an embodiment of the present disclosure.

In a further embodiment of the present disclosure, there is provided a wireless communication method for a base station as shown in FIG. 20. FIG. 20 illustrates a flowchart of a wireless communication method 2000 for a base station according to an embodiment of the present disclosure. For example, the wireless communication method 2000 may be applied to the base station 1300/1600/1700 as shown in FIGS. 13, 16, 17.

As shown in FIG. 20, the wireless communication method 2000 starts at a step S2001 in which, Uplink Control Information (UCI) and reference signals is received in Physical Uplink Shared Channel (PUSCH) on physical resource blocks (PRBs) for PUSCH from a user equipment. Then, at a step S2002, the UCI and the references signals are demapped from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain. After the step S2002, the wireless communication method 2000 is ended.

With the wireless communication method 2000, by mapping UCI to REs according to these REs' distances with REs where RSs are mapped in one or more of time domain, frequency domain and spatial domain, RS collision may be avoided and system performance may be improved in NR.

Note that, the other technical features in the base station 1300 as described above can also be incorporated in the wireless communication method 2000 and will not be described here for avoid redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:

circuitry operative to map, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain; and a transmitter operative to transmit the UCI and the reference signals in PUSCH on the PRBs to a base station.

(2). The user equipment according to (1), wherein the circuitry is further operative to map UCI to one or more available resource elements whose distances with resource elements where reference signals are mapped are shortest in one or more of time domain, frequency domain and spatial domain.

(3). The user equipment according to (1), wherein the reference signals comprise Demodulation Reference Signals (DMRSs) and Phase Tracking-Reference signals (PT-RSs), and UCI is mapped only in the layer transmitting PT-RSs in a case of multiple layer transmission.

(4). The user equipment according to (3), wherein UCI is mapped only in PRBs having PT-RSs.

(5). The user equipment according to (3) or (4), wherein Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

(6). The user equipment according to (1), wherein the reference signals comprise Demodulation Reference Signals (DMRSs), and UCI is mapped to same subcarriers as DMRSs.

(7). The user equipment according to (1), wherein mapping of UCI varies with patterns of the reference signals.

(8). The user equipment according to (1), wherein UCI comprises a plurality of types of UCI, and the plurality of types of UCI are assigned with priorities respectively, and wherein the higher the priority assigned to a type of UCI is, the shorter the distances of the one or more available resource elements, where the type of UCI is mapped, with resource elements, where reference signals are mapped, is.

(9). The user equipment according to (8), wherein all of the plurality of types of UCI are mapped to same subcarriers, and wherein the higher the priority assigned to a type of UCI is, the shorter the distances of the one or more available resource elements, where the type of UCI is mapped, with resource elements, where reference signals are mapped, in time domain is.

(10). The user equipment according to (8), wherein the higher the priority assigned to a type of UCI is, the shorter the distances of the one or more available resource elements, where the type of UCI is mapped, with resource elements, where reference signals are mapped, in both frequency domain and time domain is.

(11). The user equipment according to any one of (8)-(10), wherein the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority.

(12). The user equipment according to (1), wherein the reference signals comprise front-loaded Demodulation Reference Signals (DMRSs) and additional DMRSs, and mapping of UCI around the front-loaded DMRSs is same as or different from mapping of UCI around the additional DMRSs.

(13). The user equipment according to (1), wherein in frequency domain, UCI is evenly distributed across a PRB for PUSCH or centralized at the top and the bottom of the PRB for PUSCH.

(14). A base station, comprising:

a receiver operative to receive Uplink Control Information (UCI) and reference signals in Physical Uplink Shared Channel (PUSCH) on physical resource blocks (PRBs) for PUSCH from a user equipment; and circuitry operative to demap the UCI and the references signals from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain.

(15). The base station according to (14), wherein the demapping rule further indicates that UCI is mapped to one or more available resource elements whose distances with resource elements where reference signals are mapped are shortest in one or more of time domain, frequency domain and spatial domain.

(16). The base station according to (14), wherein the reference signals comprise Demodulation Reference Signals (DMRSs) and Phase Tracking-Reference signals (PT-RSs), and the demapping rule further indicates that UCI is mapped only in the layer transmitting PT-RSs in a case of multiple layer transmission.

(17). The base station according to (16), wherein the demapping rule further indicates that UCI is mapped only in PRBs having PT-RSs.

(18). The base station according to (16) or (17), wherein Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

(19). The base station according to (14), wherein the reference signals comprise Demodulation Reference Signals (DMRSs), and the demapping rule further indicates that UCI is mapped to same subcarriers as DMRSs.

(20). The base station according to (14), wherein mapping of UCI varies with patterns of the reference signals.

(21). The base station according to (14), wherein UCI comprises a plurality of types of UCI, and the plurality of types of UCI are assigned with priorities respectively, and wherein the higher the priority assigned to a type of UCI is, the shorter the distances of the one or more available resource elements, where the type of UCI is mapped, with resource elements, where reference signals are mapped, is.

(22). The base station according to (21), wherein the demapping rule further indicates that all of the plurality of types of UCI are mapped to same subcarriers, and that the higher the priority assigned to a type of UCI is, the shorter the distances of the one or more available resource elements, where the type of UCI is mapped, with resource elements, where reference signals are mapped, in time domain is.

(23). The base station according to (21), wherein the demapping rule further indicates that the higher the priority assigned to a type of UCI is, the shorter the distances of the one or more available resource elements, where the type of UCI is mapped, with resource elements, where reference signals are mapped, in both frequency domain and time domain is.

(24). The base station according to any one of (21)-(23), wherein the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority.

(25). The base station according to (14), wherein the reference signals comprise front-loaded Demodulation Reference Signals (DMRSs) and additional DMRSs, and mapping of UCI around the front-loaded DMRSs is same as or different from mapping of UCI around the additional DMRSs.

(26). The base station according to (14), wherein in frequency domain, UCI is evenly distributed across a PRB for PUSCH or centralized at the top and the bottom of the PRB for PUSCH.

(27). A wireless communication method for a user equipment, comprising:

mapping, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain; and transmitting the UCI and the reference signals in PUSCH on the PRBs to a base station.

(28). The wireless communication method according to (27), wherein said mapping, in physical resource blocks (PRBs) for Physical Uplink Shared Channel (PUSCH), Uplink Control Information (UCI) to one or more available resource elements according to their distances with resource elements where reference signals are mapped in one or more of time domain, frequency domain and spatial domain comprises:

mapping UCI to one or more available resource elements whose distances with resource elements where reference signals are mapped are shortest in one or more of time domain, frequency domain and spatial domain.

(29). The wireless communication method according to (27), wherein the reference signals comprise Demodulation Reference Signals (DMRSs) and Phase Tracking-Reference signals (PT-RSs), and UCI is mapped only in the layer transmitting PT-RSs in a case of multiple layer transmission.

(30). The wireless communication method according to (29), wherein UCI is mapped only in PRBs having PT-RSs.

(31). The wireless communication method according to (29) or (30), wherein Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

(32). The wireless communication method according to (27), wherein the reference signals comprise Demodulation Reference Signals (DMRSs), and UCI is mapped to same subcarriers as DMRSs.

(33). The wireless communication method according to (27), wherein mapping of UCI varies with patterns of the reference signals.

(34). The wireless communication method according to (27), wherein UCI comprises a plurality of types of UCI, and the plurality of types of UCI are assigned with priorities respectively, and wherein the higher the priority assigned to a type of UCI is, the shorter the distances of the one or more available resource elements, where the type of UCI is mapped, with resource elements, where reference signals are mapped, is.

(35). The wireless communication method according to (34), wherein all of the plurality of types of UCI are mapped to same subcarriers, and wherein the higher the priority assigned to a type of UCI is, the shorter the distances of the one or more available resource elements, where the type of UCI is mapped, with resource elements, where reference signals are mapped, in time domain is.

(36). The wireless communication method according to (34), wherein the higher the priority assigned to a type of UCI is, the shorter the distances of the one or more available resource elements, where the type of UCI is mapped, with resource elements, where reference signals are mapped, in both frequency domain and time domain is.

(37). The wireless communication method according to any one of (34)-(36), wherein the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority.

(38). The wireless communication method according to (27), wherein the reference signals comprise front-loaded Demodulation Reference Signals (DMRSs) and additional DMRSs, and mapping of UCI around the front-loaded DMRSs is same as or different from mapping of UCI around the additional DMRSs.

(39). The wireless communication method according to (27), wherein in frequency domain, UCI is evenly distributed across a PRB for PUSCH or centralized at the top and the bottom of the PRB for PUSCH.

(40). A wireless communication method for a base station, comprising:

receiving Uplink Control Information (UCI) and reference signals in Physical Uplink Shared Channel (PUSCH) on physical resource blocks (PRBs) for PUSCH from a user equipment; and demapping the UCI and the references signals from their respective resource elements in the PRBs according to a demapping rule which indicates that UCI is mapped, in the PRBs, to one or more available resource elements according to their distances with resource elements where reference signals are mapped in one or more of time domain, frequency domain and spatial domain.

(41). The wireless communication method according to (40), wherein the demapping rule further indicates that UCI is mapped to one or more available resource elements whose distances with resource elements where reference signals are mapped are shortest in one or more of time domain, frequency domain and spatial domain.

(42). The wireless communication method according to (40), wherein the reference signals comprise Demodulation Reference Signals (DMRSs) and Phase Tracking-Reference signals (PT-RSs), and the demapping rule further indicates that UCI is mapped only in the layer transmitting PT-RSs in a case of multiple layer transmission.

(43). The wireless communication method according to (42), wherein the demapping rule further indicates that UCI is mapped only in PRBs having PT-RSs.

(44). The wireless communication method according to (42) or (43), wherein Cyclic Prefix-Orthogonal Frequency Division Multiplexing (CP-OFDM) or Discrete Fourier Transform-spread-Orthogonal Frequency Division Multiplexing (DFT-S-OFDM) in which PT-RSs are pre-DFT is employed in PUSCH.

(45). The wireless communication method according to (40), wherein the reference signals comprise Demodulation Reference Signals (DMRSs), and the demapping rule further indicates that UCI is mapped to same subcarriers as DMRSs.

(46). The wireless communication method according to (40), wherein mapping of UCI varies with patterns of the reference signals.

(47). The wireless communication method according to (40), wherein UCI comprises a plurality of types of UCI, and the plurality of types of UCI are assigned with priorities respectively, and wherein the higher the priority assigned to a type of UCI is, the shorter the distances of the one or more available resource elements, where the type of UCI is mapped, with resource elements, where reference signals are mapped, is.

(48). The wireless communication method according to (47), wherein the demapping rule further indicates that all of the plurality of types of UCI are mapped to same subcarriers, and that the higher the priority assigned to a type of UCI is, the shorter the distances of the one or more available resource elements, where the type of UCI is mapped, with resource elements, where reference signals are mapped, in time domain is.

(49). The wireless communication method according to (47), wherein the demapping rule further indicates that the higher the priority assigned to a type of UCI is, the shorter the distances of the one or more available resource elements, where the type of UCI is mapped, with resource elements, where reference signals are mapped, in both frequency domain and time domain is.

(50). The wireless communication method according to any one of (47)-(49), wherein the plurality of types of UCI comprise Hybrid Automatic Repeat request-Acknowledgment (HARQ-ACK), Rank Indicator (RI), Beam management/recovery and Channel State Information (CSI), which are assigned with priorities respectively in descending order of priority.

(51). The wireless communication method according to (40), wherein the reference signals comprise front-loaded Demodulation Reference Signals (DMRSs) and additional DMRSs, and mapping of UCI around the front-loaded DMRSs is same as or different from mapping of UCI around the additional DMRSs.

(52). The wireless communication method according to (40), wherein in frequency domain, UCI is evenly distributed across a PRB for PUSCH or centralized at the top and the bottom of the PRB for PUSCH.

The invention claimed is:

1. An integrated circuit, comprising:

mapping circuitry, which, in operation, controls mapping Hybrid Automatic Repeat request-Acknowledgement (HARQ-ACK) bits, Channel State Information (CSI) bits and data in a Physical Uplink Shared Channel (PUSCH); and transmission circuitry, which, in operation, controls transmitting the HARQ-HACK bits, the CSI bits and the data by using Cyclic Prefix-Orthogonal Frequency Division Multiplexing (CP-OFDM) in 14 OFDM symbols;

wherein the HARQ-ACK bits are mapped to two non-consecutive first OFDM symbols in the 14 OFDM symbols which are different from two non-consecutive second OFDM symbols, wherein demodulation reference signals (DMRSs) are mapped to a part of assigned subcarriers of the two non-consecutive second OFDM symbols, wherein one of the two non-consecutive first OFDM symbols is adjacent to and later than one of the two non-consecutive second OFDM symbols, and another one of the two non-consecutive first OFDM symbols is adjacent to and later than another one of the two non-consecutive second OFDM symbols, wherein the CSI bits are mapped to a third OFDM symbol which is different from the two non-consecutive first OFDM symbols, and wherein the HARQ-ACK bits are mapped to distributed resource elements in a frequency domain within allocated resource blocks.

2. The integrated circuit according to claim 1, wherein a mapping of the HARQ-ACK bits near the one of the two non-consecutive second OFDM symbols is the same as that near the another one of the two non-consecutive second OFDM symbols.

3. The integrated circuit according to claim 1, wherein the HARQ-ACK bits are not mapped to resource elements to which a Phase Tracking-Reference Signal (PT-RS) is mapped.

4. The integrated circuit according to claim 1, wherein the CSI bits are mapped after the HARQ-ACK bits.

5. The integrated circuit according to claim 1, wherein the HARQ-ACK bits are not mapped to an OFDM symbol adjacent to and prior to at least either one of the two non-consecutive second OFDM symbols.

6. The integrated circuit according to claim 5, wherein the data is mapped to subcarriers other than the part of assigned subcarriers of the two non-consecutive second OFDM symbols.

7. The integrated circuit according to claim 1, wherein data is mapped to subcarriers other than the part of assigned subcarriers of the two non-consecutive second OFDM symbols.

8. The integrated circuit according to claim 1, wherein the HARQ-ACK bits are not mapped to an OFDM symbol adjacent to and prior to one of the two non-consecutive second OFDM symbols, and the data is mapped to said OFDM symbol.

9. The integrated circuit according to claim 1, wherein the non-consecutive second OFDM symbols are different according to a mapping pattern of the DMRSs.

10. A communication apparatus comprising:

control circuitry, which, in operation, maps Hybrid Automatic Repeat request-Acknowledgement (HARQ-ACK) bits, Channel State Information (CSI) bits and data in a Physical Uplink Shared Channel (PUSCH); and a transmitter, which, in operation, transmits the HARQ-ACK bits, the CSI bits and the data by using Cyclic Prefix-Orthogonal Frequency Division Multiplexing (CP-OFDM) in 14 OFDM symbols;

wherein the HARQ-ACK bits are mapped to two non-consecutive first OFDM symbols in the 14 OFDM symbols which are different from two non-consecutive second OFDM symbols, wherein demodulation reference signals (DMRSs) are mapped to a part of assigned subcarriers of the two non-consecutive second OFDM symbols, wherein one of the two non-consecutive first OFDM symbols is adjacent to and later than one of the two non-consecutive second OFDM symbols, and another one of the two non-consecutive first OFDM symbols is adjacent to and later than another one of the two non-consecutive second OFDM symbols, wherein the CSI bits are mapped to a third OFDM symbol which is different from the two non-consecutive first OFDM symbols, and wherein the HARQ-ACK bits are mapped to distributed resource elements in a frequency domain within allocated resource blocks.

11. The communication apparatus according to claim 10, wherein a mapping of the HARQ-ACK bits near the one of the two non-consecutive second OFDM symbols is the same as that near the another one of the two non-consecutive second OFDM symbols.

12. The communication apparatus according to claim 10, wherein the HARQ-ACK bits are not mapped to resource elements to which a Phase Tracking-Reference Signal (PT-RS) is mapped.

13. The communication apparatus according to claim 10, wherein the CSI bits are mapped after the HARQ-ACK bits.

14. The communication apparatus according to claim 10, wherein the HARQ-ACK bits are not mapped to an OFDM symbol adjacent to and prior to at least either one of the two non-consecutive second OFDM symbols.

15. The communication apparatus according to claim 14, wherein the data is mapped to subcarriers other than the part of assigned subcarriers of the two non-consecutive second OFDM symbols.

16. The communication apparatus according to claim 10, wherein data is mapped to subcarriers other than the part of assigned subcarriers of the two non-consecutive second OFDM symbols.

17. The communication apparatus according to claim 10, wherein the HARQ-ACK bits are not mapped to an OFDM symbol adjacent to and prior to one of the two non-consecutive second OFDM symbols, and the data is mapped to said OFDM symbol.

18. The communication apparatus according to claim 10, wherein the non-consecutive second OFDM symbols are different according to a mapping pattern of the DMRSs.

19. A communication method comprising:

mapping Hybrid Automatic Repeat request-Acknowledgement (HARQ-ACK) bits, Channel State Information (CSI) bits and data in a Physical Uplink Shared Channel (PUSCH); and transmitting the HARQ-ACK bits, the CSI bits and the data by using Cyclic Prefix-Orthogonal Frequency Division Multiplexing (CP-OFDM) in 14 OFDM symbols;

wherein the HARQ-ACK bits are mapped to two non-consecutive first OFDM symbols in the 14 OFDM symbols which are different from two non-consecutive second OFDM symbols, wherein demodulation reference signals (DMRSs) are mapped to a part of assigned subcarriers of the two non-consecutive second OFDM symbols, wherein one of the two non-consecutive first OFDM symbols is adjacent to and later than one of the two non-consecutive second OFDM symbols, and another one of the two non-consecutive first OFDM symbols is adjacent to and later than another one of the two non-consecutive second OFDM symbols, wherein the CSI bits are mapped to a third OFDM symbol which is different from the two non-consecutive first OFDM symbols, and wherein the HARQ-ACK bits are mapped to distributed resource elements in a frequency domain within allocated resource blocks.

* * * * *